United States Patent
Ozawa et al.

(10) Patent No.: US 7,697,168 B2
(45) Date of Patent: Apr. 13, 2010

(54) IMAGE PROCESSING APPARATUS AND METHOD FOR GENERATING BITMAP DATA AND ATTRIBUTE INFORMATION FROM A RASTER DATA

(75) Inventors: Shuuji Ozawa, Tokyo (JP); Ryousuke Suzuki, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 11/446,234

(22) Filed: Jun. 5, 2006

(65) Prior Publication Data
US 2006/0279813 A1     Dec. 14, 2006

(30) Foreign Application Priority Data
Jun. 9, 2005     (JP)     ............... 2005-170044

(51) Int. Cl.
G06K 15/00     (2006.01)
H04N 1/405     (2006.01)
G06F 15/00     (2006.01)
G06K 1/00      (2006.01)
H04N 1/60      (2006.01)

(52) U.S. Cl. ........................................ 358/3.1; 358/1.9
(58) Field of Classification Search .................. 358/1.9, 358/2.1, 1.16, 1.13, 1.14, 1.15, 1.6, 1.18, 358/3.23, 3.24
See application file for complete search history.

(56) References Cited

U.S. PATENT DOCUMENTS 6,977,754 B2    12/2005   Matsumoto et al.
7,301,669 B1 *  11/2007   Yamada et al. ............... 358/1.9

FOREIGN PATENT DOCUMENTS

| JP | 2000-259819   | 9/2000  |
|----|---------------|---------|
| JP | 2001-358929 A | 12/2001 |
| JP | 2004-334533 A | 11/2004 |

* cited by examiner

Primary Examiner—Douglas Q Tran
(74) Attorney, Agent, or Firm—Fitzpatrick, Cella, Harper & Scinto

(57) ABSTRACT

In order to improve print image quality, attribute information is generated for each pixel of a bitmap image generated according to a drawing command, and the bitmap image and attribute information are written in a memory. However, when this is done, data amount to be written in the memory increases, and the rasterize processing speed lowers. Hence, a display list is generated by interpreting PDL data, a bitmap image and attribute information of each pixel are rasterized based on the display list, and the bitmap image and attribute information are written in the memory. In this case, a black attribute is written in attribute information of an object filled with black, and the color value of that object is not written in the bitmap image.

4 Claims, 31 Drawing Sheets

PRIOR ART

FIG. 2B

| (255,0,0) | (255,0,0) | (255,0,0) | (0,0,0) | (0,0,0) | (0,0,0) |
|---|---|---|---|---|---|
| (255,0,0) | (255,0,0) | (255,0,0) | (0,0,0) | (0,0,0) | (0,0,0) |
| (255,0,0) | (255,0,0) | (0,0,0) | (0,0,0) | (0,0,0) | (255,0,0) |
| (255,0,0) | (255,0,0) | (0,0,0) | (0,0,0) | (0,0,0) | (255,0,0) |
| (255,0,0) | (0,0,0) | (0,0,0) | (0,0,0) | (255,0,0) | (255,0,0) |
| (255,0,0) | (0,0,0) | (0,0,0) | (0,0,0) | (255,0,0) | (255,0,0) |

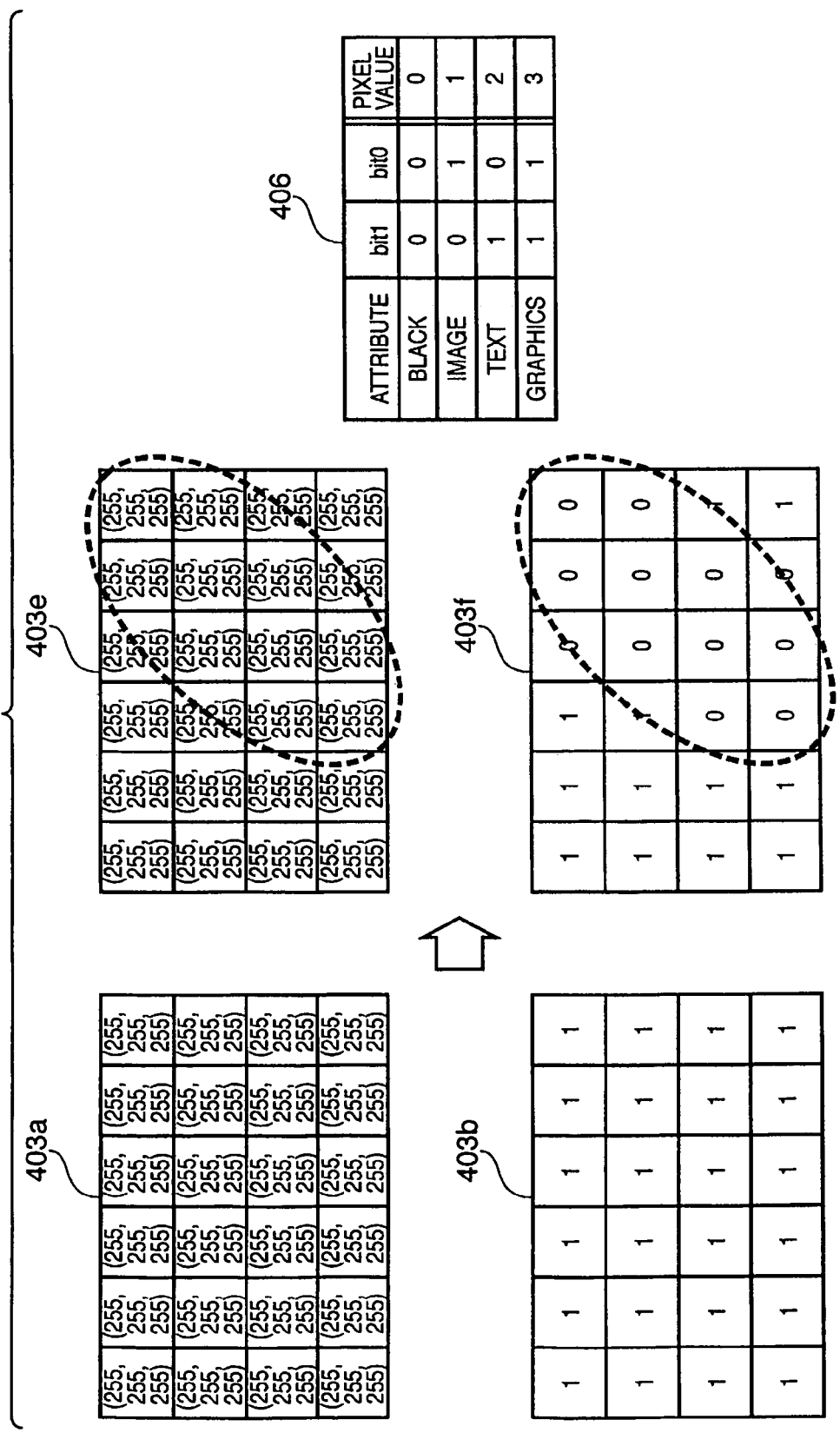

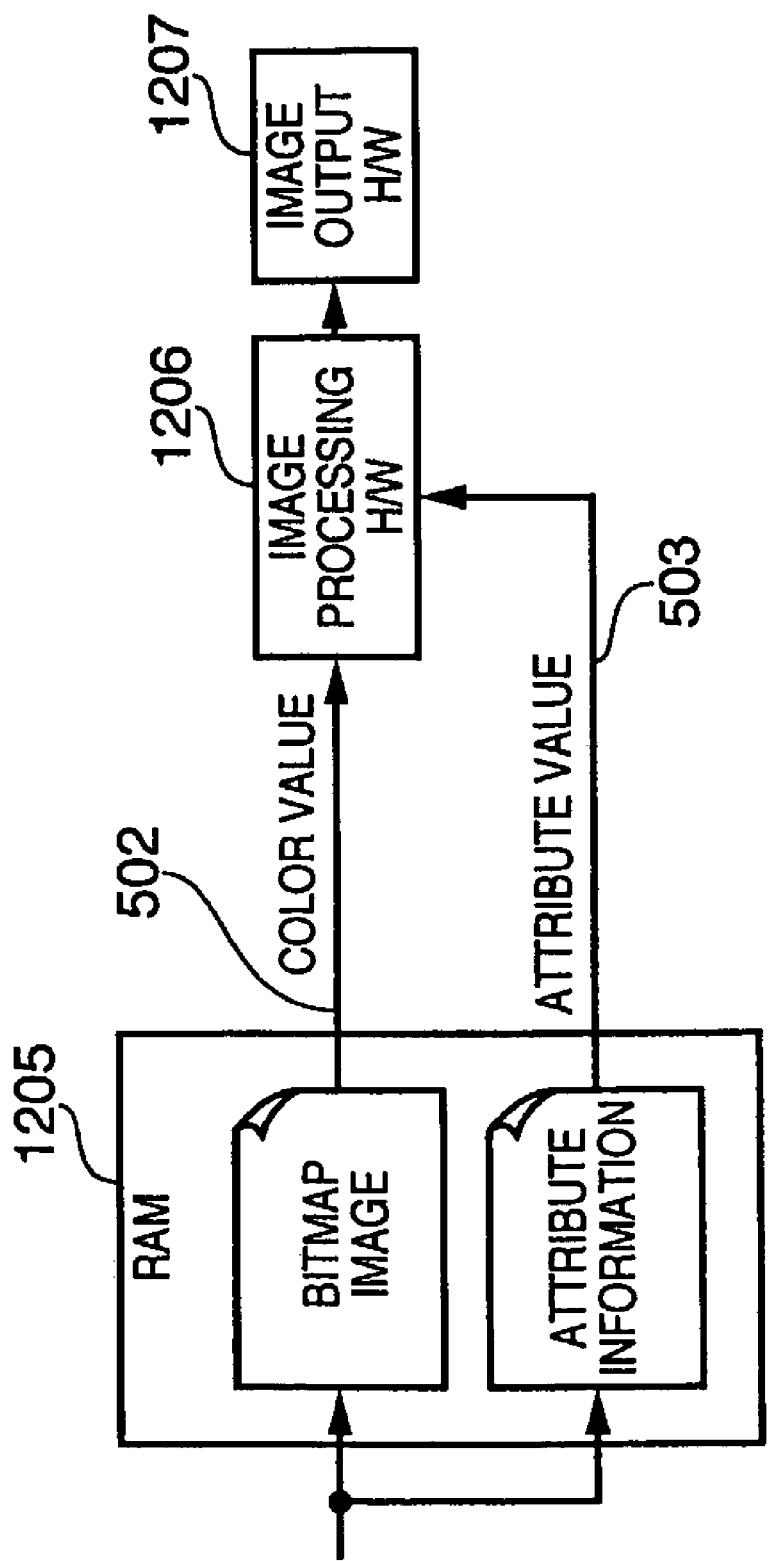

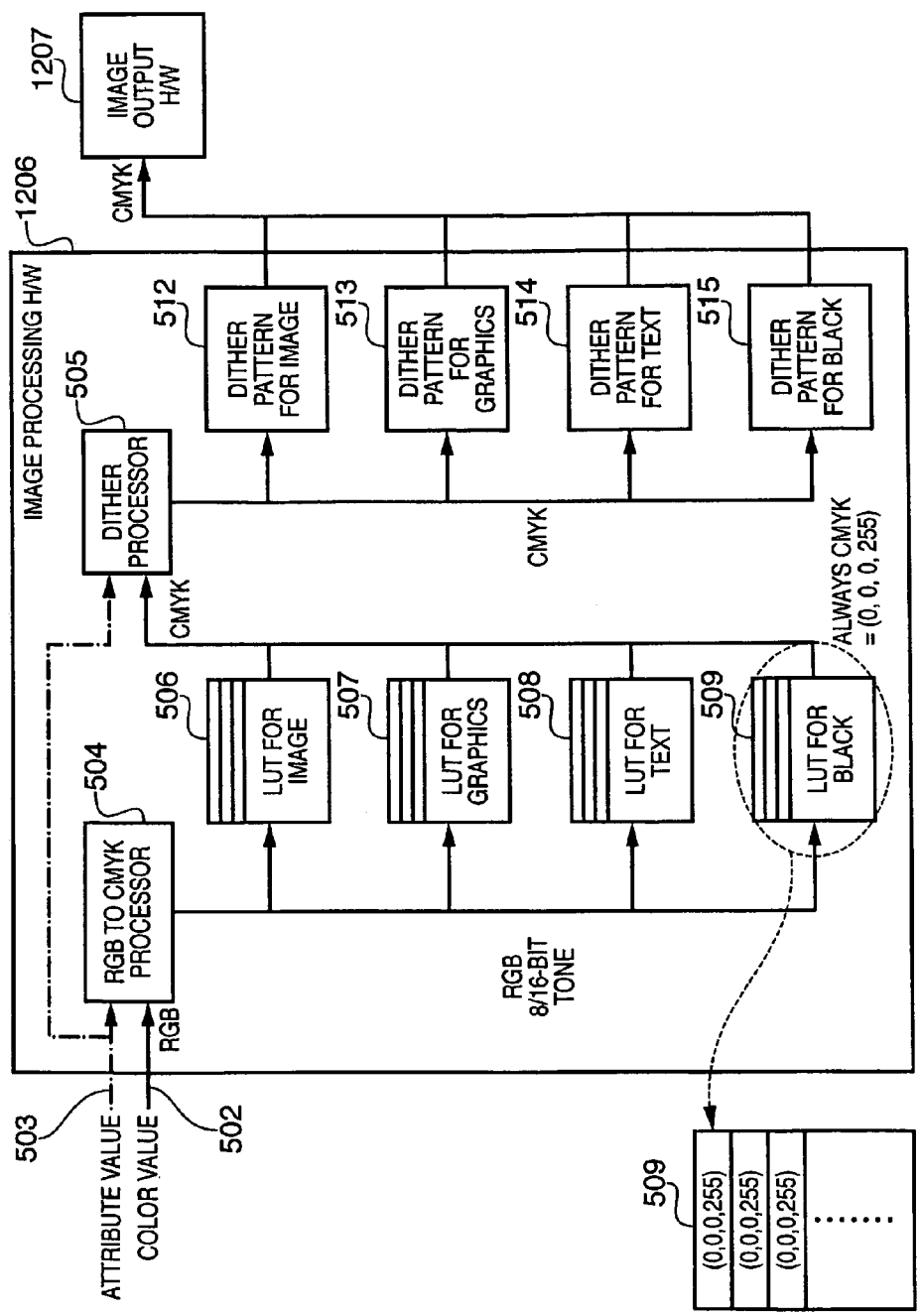

| ATTRIBUTE | bit1 | bit0 |
|---|---|---|
| NOT ASSIGNED | 0 | 0 |
| IMAGE | 0 | 1 |
| TEXT | 1 | 0 |
| GRAPHICS | 1 | 1 |

| ATTRIBUTE | bit1 | bit0 |
|---|---|---|
| BLACK | 0 | 0 |
| IMAGE | 0 | 1 |
| TEXT | 1 | 0 |
| GRAPHICS | 1 | 1 |

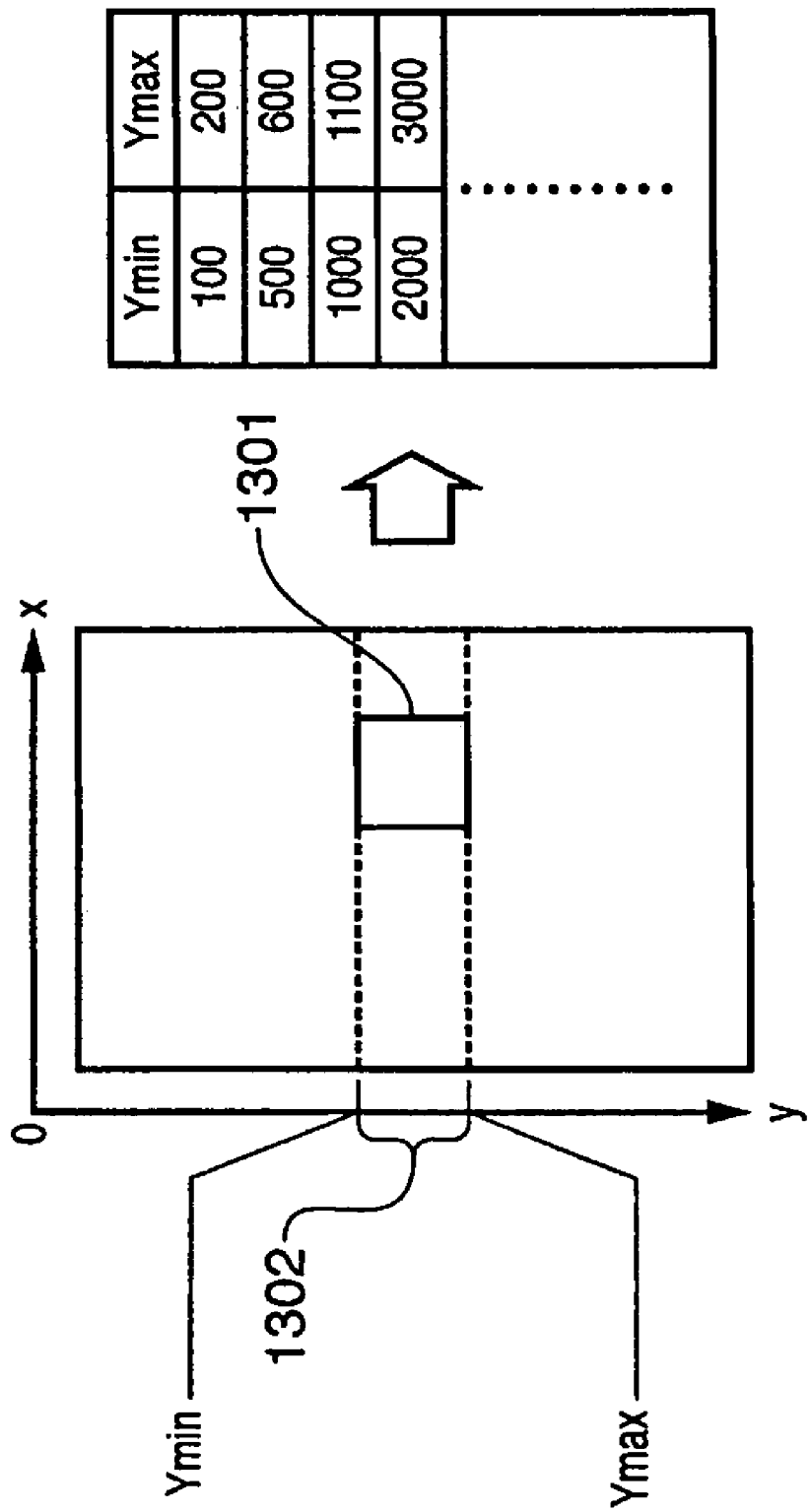

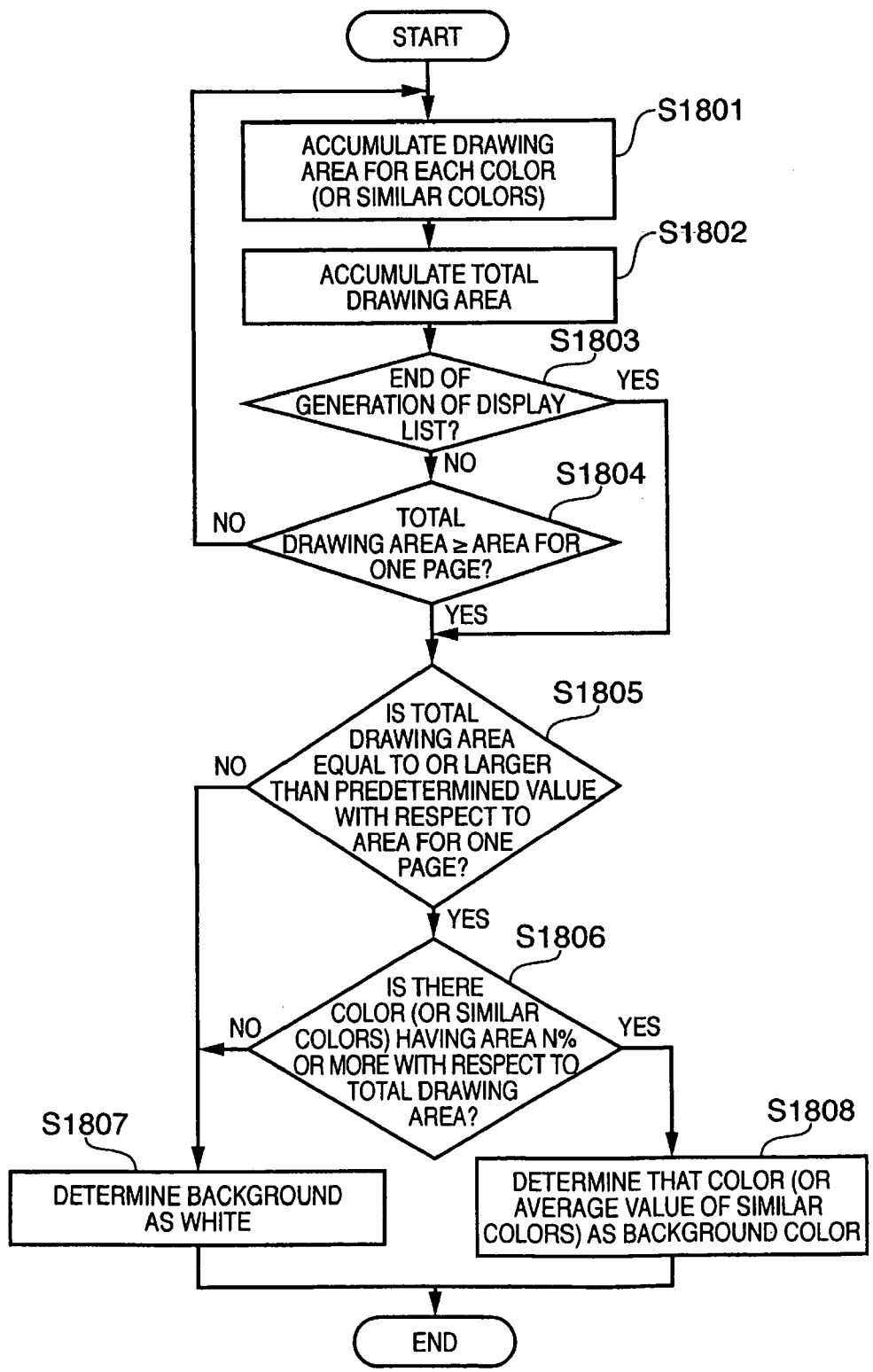

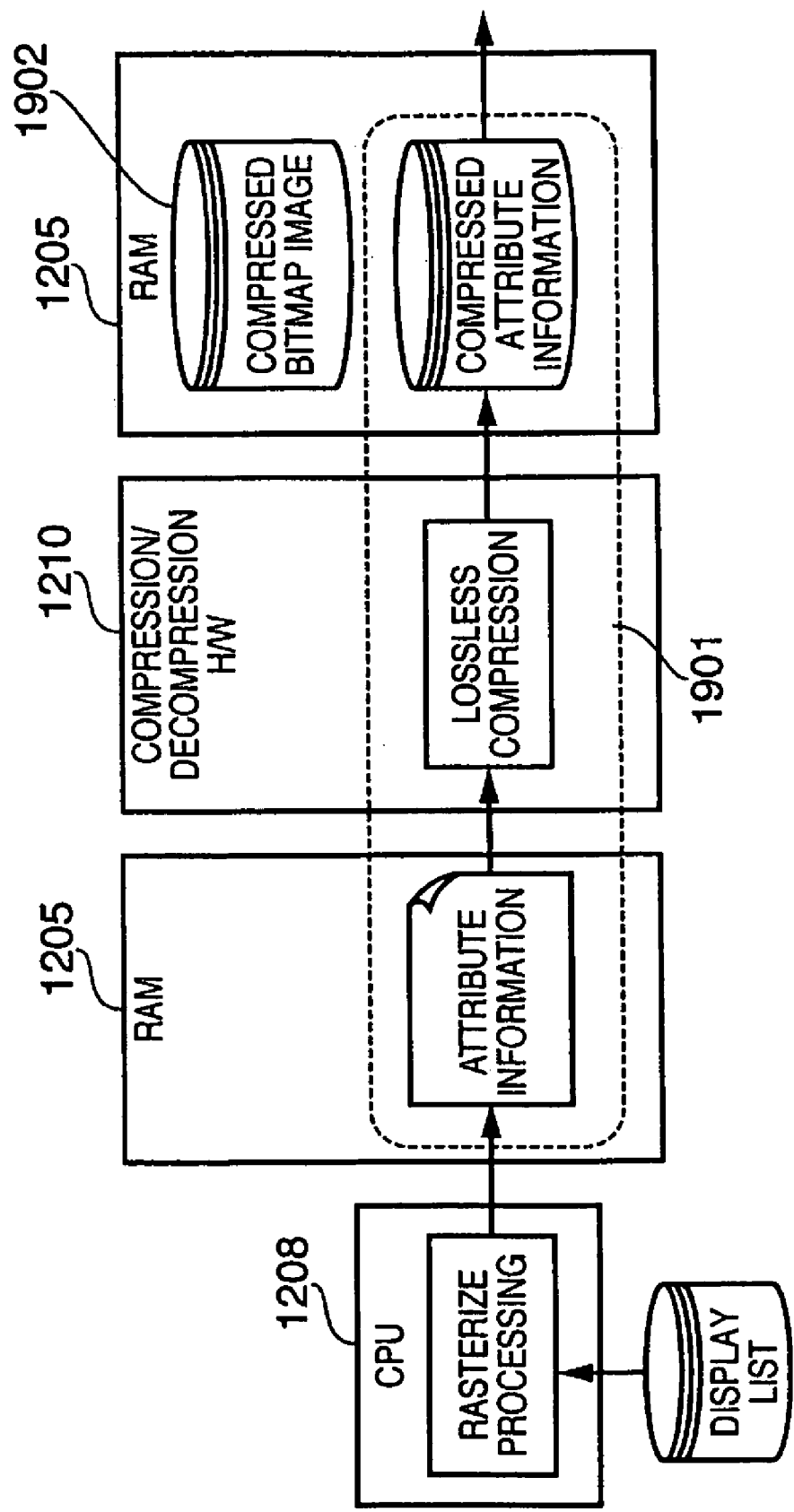

IMAGE PROCESSING APPARATUS AND METHOD FOR GENERATING BITMAP DATA AND ATTRIBUTE INFORMATION FROM A RASTER DATA

FIELD OF THE INVENTION

The present invention relates to an image processing apparatus and method and, more particularly, to image processing for generating a bitmap image and attribute information from raster data of objects.

BACKGROUND OF THE INVENTION

In recent years, image processing apparatuses such as laser beam printers and the like which use an electrophotography method are popularly used as output apparatuses of computers. These image processing apparatuses comprise a function of executing print processing by converting a drawing command received from a host computer into image data.

FIG. 1 is a block diagram showing the arrangement of a general image processing apparatus. Processing for converting a drawing command received from a host computer into image data, and printing the converted data on a sheet surface will be described below using FIG. 1.

An application 201 which runs on a host computer 200 is used to create, e.g., a page layout document, wordprocessor document, graphic document, and the like. A printer driver 202 generates a drawing command based on digital document data created by the application. The drawing command generated by the printer driver 202 is described using a printer description language called a page description language (PDL), which is used to create page image data. The drawing command normally includes text, graphic, image drawing instructions and the like.

The drawing command generated by the printer driver 202 is transferred to an image processing apparatus 203 via a network or the like.

Upon reception of the drawing command from the host computer 200, the image processing apparatus 203 interprets the drawing command by a PDL interpreter 204. Based on the interpretation result, a display list generator 205 generates a display list 212 which can be processed by a rasterize processor 206. The rasterize processor 206 generates a bitmap image 210 by rasterizing the display list 212, and stores the generated bitmap image in a data storage unit 207.

An image processor 208 converts the bitmap image 210 stored in the data storage unit 207 into an image format that can be output to an image output unit 209 by applying image processing such as color conversion processing, pseudo-halftone processing, and the like to the bitmap image 210.

Assume that input data to the image output unit 209 are CMYK image data corresponding to four color materials of cyan (C), magenta (M), yellow (Y), and black (K), and the bitmap image 210 generated by the rasterize processor 206 is RGB image data. In this case, the image processor 208 converts RGB image data stored in the data storage unit 207 into CMYK image data using a lookup table (LUT) or the like. Normally, the image output unit 209 can output only a low-tone (2-, 4-, 16-tone levels, or the like) image in many cases. Therefore, in order to allow the image output unit 209 which can output only a small number of tone levels to attain stable halftone expression, the image processor 208 executes pseudo-halftone processing.

The image processor 208 also applies smoothing processing to an edge portion of an image to obtain a more preferable image.

The image output unit 209 receives image data generated in a predetermined image format, and executes output processing. In this way, an image expressed by the drawing command output from the host computer 200 is printed on a sheet surface.

In order to improve print image quality in the aforementioned image data generation process, attribute information is often appended to pixels of the bitmap image 210 generated according to the drawing command. For example, see Japanese Patent Laid-Open No. 2000-259819.

That is, the rasterize processor 206 generates attribute information 211 indicating the types of image characteristics of image regions to which respective pixels belong simultaneously with generation of the bitmap image 210, and stores the generated information in the data storage unit 207.

The attribute information indicates the region attributes of pixels when image regions are classified according to their image characteristics. The attribute information includes a text attribute which indicates a pixel included in text data or an image region having that image characteristic. Also, the attribute information includes an image attribute which indicates a pixel included in bitmap data or an image region having that image characteristic. Furthermore, the attribute information includes a graphics attribute which indicates a pixel included in draw data or an image region having that image characteristic, and the like. That is, by appending the attribute information 211 to each pixel of the bitmap image 210, the image processor 208 can execute image processing suited to the image characteristics of respective image regions for respective pixels.

For example, LUTs used upon color conversion from RGB image data to CMYK image data are switched between the image attribute and text attribute. Screen processing is applied using different matrices for respective region attributes, and a low LPI screen that gives priority to tone characteristics is applied to a photo image of the image attribute. Also, a high LPI screen that gives priority to a resolution can be applied to characters of the text attribute and lines of the graphics attribute.

In this manner, since the rasterize processor 206 generates the attribute information 211 based on raster objects, image processing can be switched for respective objects included in the drawing command.

FIGS. 2A to 2C are views for explaining generation of the bitmap image 210 and attribute information 211 in more detail. FIG. 2A shows an image formation result, and a character "A" 302 (color is RGB=(0, 0, 0)) of the text attribute is formed on a rectangle 301 (color is RGB=(255, 0, 0)) of the graphics attribute.

FIG. 2B is an enlarged view of a part 303 of the rasterization result (bitmap image 210) of the character 302. The bitmap image 210 is made up of a pixel array shown in FIG. 2B having 8-bit R, G, and B data (a total of 24) bits) per pixel.

FIG. 2C shows attribute information 211 of pixels shown in FIG. 2B, and the attribute information 211 of each pixel is given by 2 bits in this example. Note that the bitwidth of the attribute information changes depending on the number of attributes to be handled. A table 304 which indicates the relationship between attribute information and region attributes is separately prepared. That is, the attribute information 211 is made up of a pixel sequence shown in FIG. 2C having 2 bits per pixel.

The rasterize processor 206 writes, as attribute information, "3" indicating the graphics attribute in each pixel of RGB=(255, 0, 0) shown in FIG. 2B, and "2" indicating the text attribute in each pixel of RGB (0, 0, 0) shown in FIG. 2B.

However, the aforementioned technique must store the attribute information 211 corresponding to respective pixels in the data storage unit 207 in addition to the bitmap image 210 generated according to the drawing command so as to improve the print image quality. As a result, the data volume to be read out from and written in the data storage unit 207 unwantedly increases.

As for simple black, the result after color conversion and halftoning is black irrespective of attributes. In other words, no difference is generated depending on attribute information (no attribute information is required). For a simple black image, not only attribute information is not necessary, but also multi-values (e.g., 8 bits or 16 bits) need not be assigned to one pixel of the bitmap image 210 and such image can be expressed by binary data (1 bit). When the aforementioned technique is applied to black or an image including a larger black part than other colors such as a simple black image, the image forming speed decreases due to wasteful read and write accesses to the data storage unit 207.

SUMMARY OF THE INVENTION

The first aspect of the present invention discloses an image processing apparatus comprising a generator, arranged to generate a bitmap image and attribute information for respective pixels from drawing data of objects; and an image processor, arranged to apply image processing based on the attribute information to the bitmap image data, wherein the generator generates attribute information indicating a specific color, and does not write, in the bitmap image, a color value of a pixel for which the attribute information indicating the specific color is generated.

According to the present invention, the drawing processing speed can be improved by suppressing the data volume generated by rasterize processing.

The second aspect of the present invention discloses the apparatus further comprising: a data compressor, arranged to apply lossy compression to the bitmap image, apply lossless compression to the attribute information, and store the compressed bitmap image and the compressed attribute information in a memory; a data decompressor, arranged to read out and decompress the compressed bitmap image and the compressed attribute information from the memory; and an extractor, arranged to extract an object which readily suffers image deterioration by the lossy compression, wherein the generator sets attribute information corresponding to the object extracted by the extractor, and does not write, in the bitmap image, a color value of a pixel for which the set attribute information is generated.

According to the present invention, deterioration of image quality can be suppressed when rasterized data is compressed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2A to 2C are views for explaining generation of a bitmap image and attribute information in more detail;

FIGS. 5A to 5C are views for explaining rasterize processing;

FIG. 6A is a block diagram showing image processing and image output processing;

FIG. 6B is a block diagram showing color conversion processing and halftone processing executed by image processing H/W;

FIG. 13A is a view for explaining processing that does not apply any black attribute to a region where a raster operation that refers to a background exists;

FIG. 18 is a flowchart showing processing for determining the color of a background; and FIG. 19 is a view for explaining image processing according to the sixth embodiment.

DESCRIPTION OF THE PREFERRED EMBODIMENTS

Image processing according to preferred embodiments of the present invention will be described in detail hereinafter with reference to the accompanying drawings.

An example in which the present invention is applied to a laser beam printer will be explained hereinafter. However, the present invention is not limited to such specific printer, and can be applied to arbitrary printers (ink-jet printer and multi-functional peripheral equipment) without departing from the gist of the present invention.

First Embodiment

[Arrangement of Printer]

Figure 1:
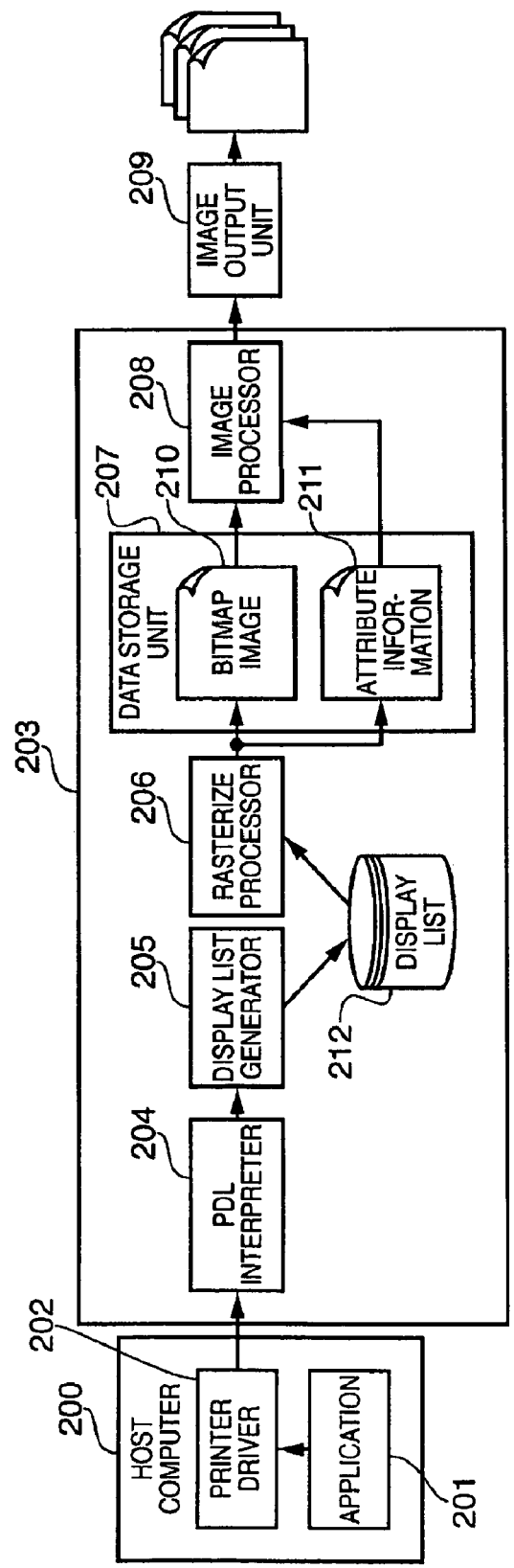
FIG. 1 is a block diagram showing the arrangement of a general image processing apparatus.
Figure 2A:
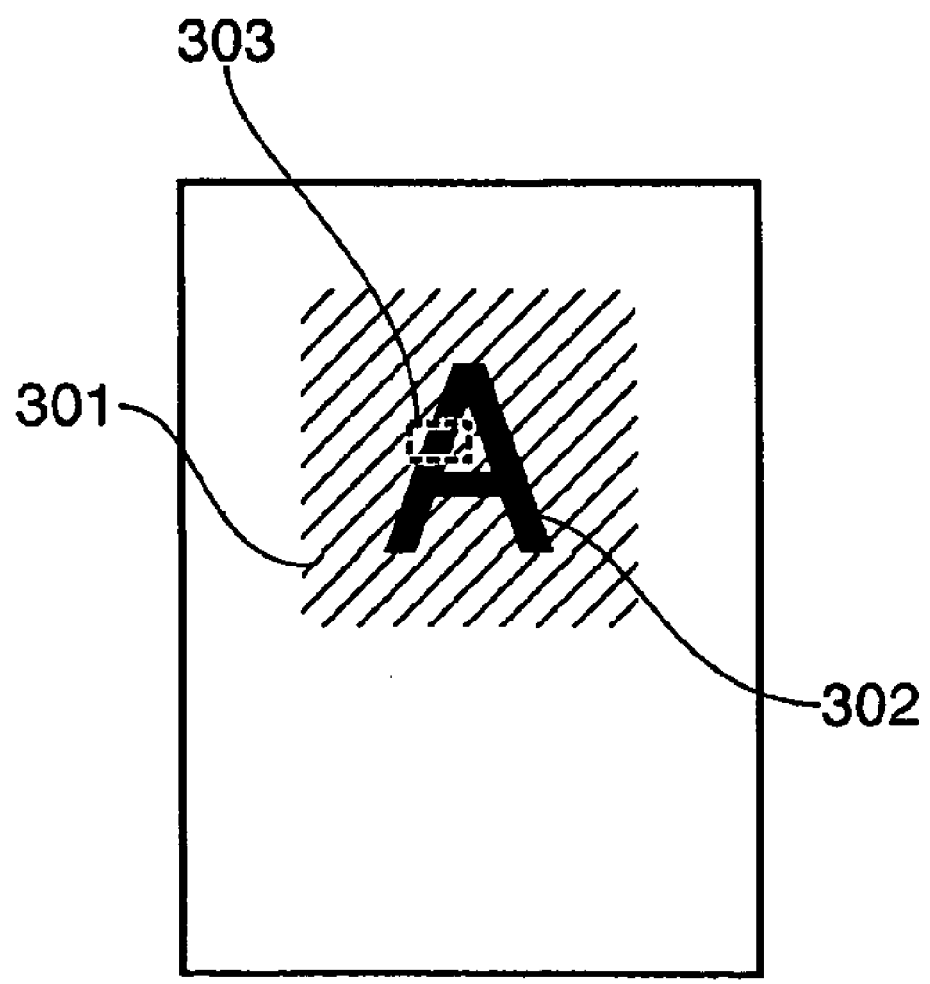
Figure 2C:
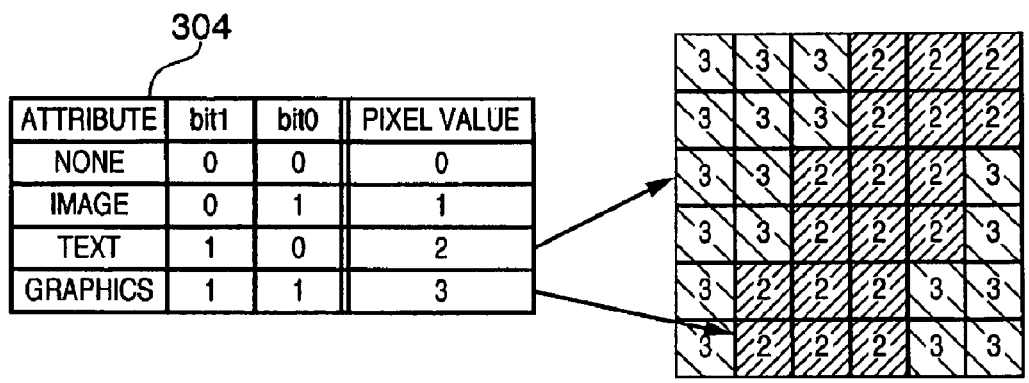
Figure 3:
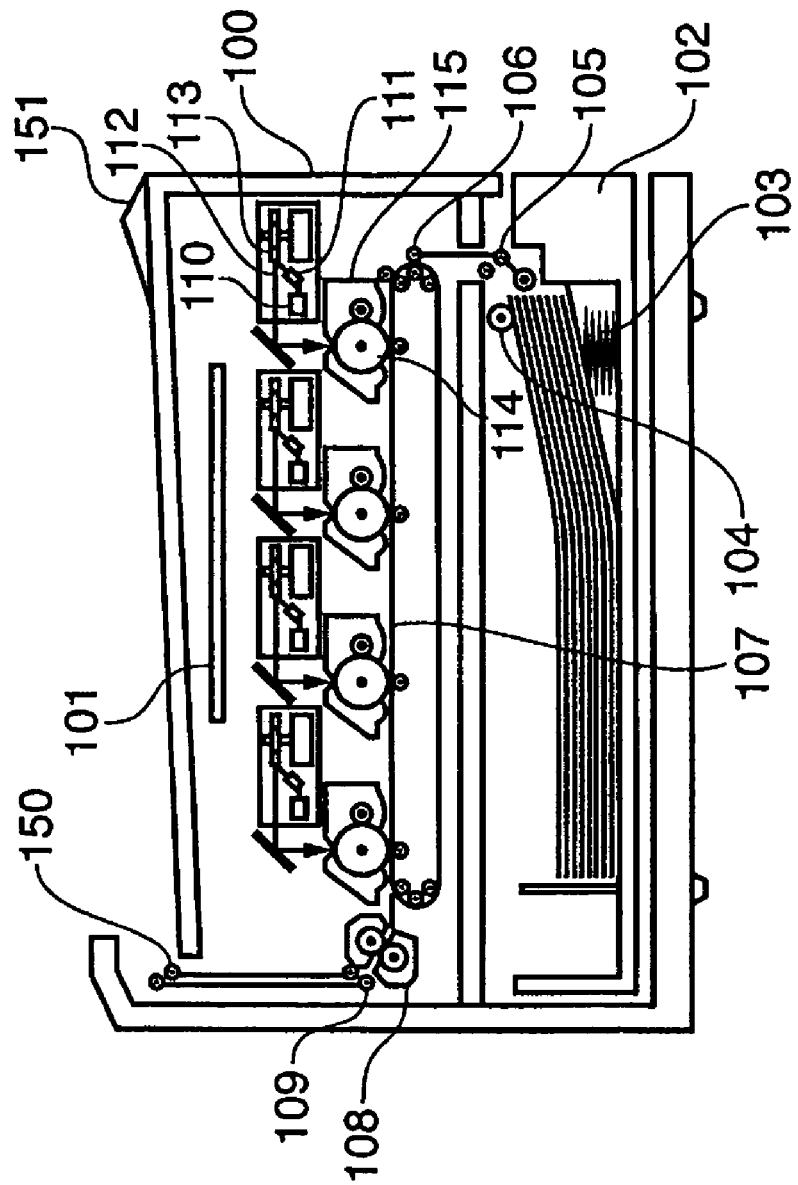
FIG. 3 is a view for explaining the structure of a laser beam printer.

FIG. 3 is a view for explaining the structure of a laser beam printer (to be simply referred to as "printer" hereinafter).

Referring to FIG. 3, a printer 100 generates corresponding character patterns, graphics, images, and the like in accordance with a text drawing instruction, various graphics drawing instructions, image drawing instruction, color designation instruction, and the like, which are supplied from an externally connected computer (not shown). The printer 100 then forms an image on a print sheet as a print medium.

On a control panel 151, switches to be operated by the user, LED indicators and an LCD display used to display the status of the printer 100, and the like are arranged. A printer control unit 101 controls the overall printer 100, and interprets the above instructions supplied from a host computer. Note that the printer 100 of the first embodiment has M, C, Y, and K image formation and development stations which respectively convert RGB color information into color information of magenta (M), cyan (C), yellow (Y), and black (K) and parallelly form and develop images of respective color components.

The printer control unit 101 generates M, C, Y, and K print images, converts them into video signals, and outputs the video signals to M, C, Y, and K laser drivers.

A magenta laser driver 110 drives a semiconductor laser element 111, and controls to turn on/off a laser beam 112 which is output from the semiconductor laser element 111 in accordance with the input video signal. The laser beam 112 is deflected in the right-and-left directions by a rotary polygonal mirror 113 to scan the surface of an electrostatic drum 114. In this manner, an electrostatic latent image that represents character and graphics patterns is formed on the electrostatic drum 114. This latent image is developed by a developing unit (toner cartridge) 115 arranged around the electrostatic drum 114, and is then transferred onto a print sheet. The image formation and development processes in the M station have been described. Other stations perform the same image formation and development processes as in the M station. Therefore, a description other than the M station will be omitted.

A cut sheet is used as a print sheet. Print sheets are stored in a paper cassette 102 attached to the printer, and the top surface of print sheets is maintained at a given level by a spring 103. Each print sheet is picked up into the printer by rotation of a paper feed roller 104 and convey rollers 105 and 106, and passes through the M, C, Y, and K stations while being placed on a print sheet conveyor belt 107, so that M, C, Y, and K toners (powder inks) are transferred to overlap each other. The toners of respective colors are fixed on the print sheet by heat and pressure of a fixing unit 108. After that, the print sheet is exhausted outside the printer 100 by convey rollers 109 and 150.

Figure 4:
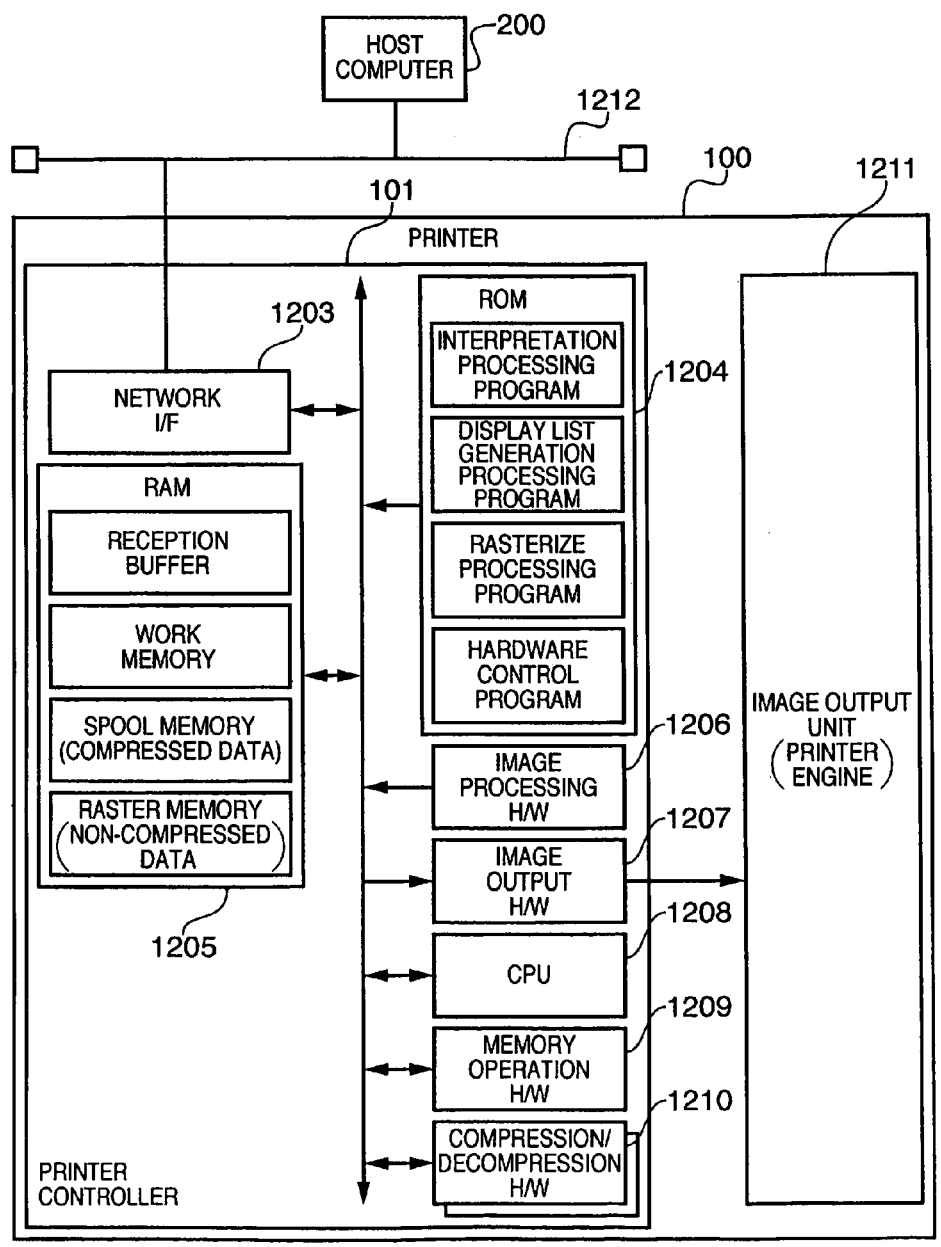
FIG. 4 is a block diagram showing the arrangement of a printer control unit (printer controller) which controls the printer.

FIG. 4 is a block diagram showing the printer control unit (printer controller) 101 which controls the printer 100.

The printer controller 101 comprises a network interface (I/F) 1203 which receives PDL data from a host computer 200 via a network 1212.

A CPU 1208 executes programs stored in a ROM 1204 using a RAM 1205 as a work memory. The ROM 1204 stores an interpretation processing program, display list processing program, and rasterize program which are used to process the received PDL data. Also, the ROM 1204 stores hardware control programs required to control image processing hardware (H/W) 1206, image output H/W 1207, memory operation H/W 1209, and compression/decompression H/W 1210.

The RAM 1205 is used as a work memory of the CPU 1208. Also, the RAM 1205 is used as a reception buffer for storing the received PDL data, a display list storage area, and a storage area of a bitmap image and attribute information obtained by rasterize processing.

The image processing H/W 1206 is a hardware accelerator which implements image processing by hardware. The image output H/W 1207 is a hardware accelerator which implements image output processing using hardware. The memory operation H/W 1209 is a hardware accelerator which comprises a function of copying data between memories, and initializing a memory area by writing a given value. The compression/decompression H/W 1210 is a hardware accelerator which implements compression/decompression processing of data upon copying between memories, and supports a plurality of compression formats, e.g., lossy compression represented by JPEG, and lossless compression such as JBIG or the like. These hardware accelerators can perform parallel operations, and high-speed image formation processing (improvement of the print speed) can be expected by performing parallel operations of respective processing units shown in FIG. 4. These hardware accelerators exchange data via the RAM 1205 and can also directly exchange data without the intervention of the RAM 1205. For example, the image processing H/W 1206 directly inputs data to the image output H/W 1207 without the intervention of the RAM 1205.

The printer controller 101 handles RGB image data as 24 bits per pixel (each color component is 8 bits/pixel). Also, the printer controller 101 handles CMYK image data as 32 bits (each color component is 8 bits/pixel). However, the present invention is not limited to such specific numerical values. For example, each color component of RGB image data may be expressed by 16 bits/pixel, and 48-bit data may be used.

[Rasterize Processing]

Figure 5A:
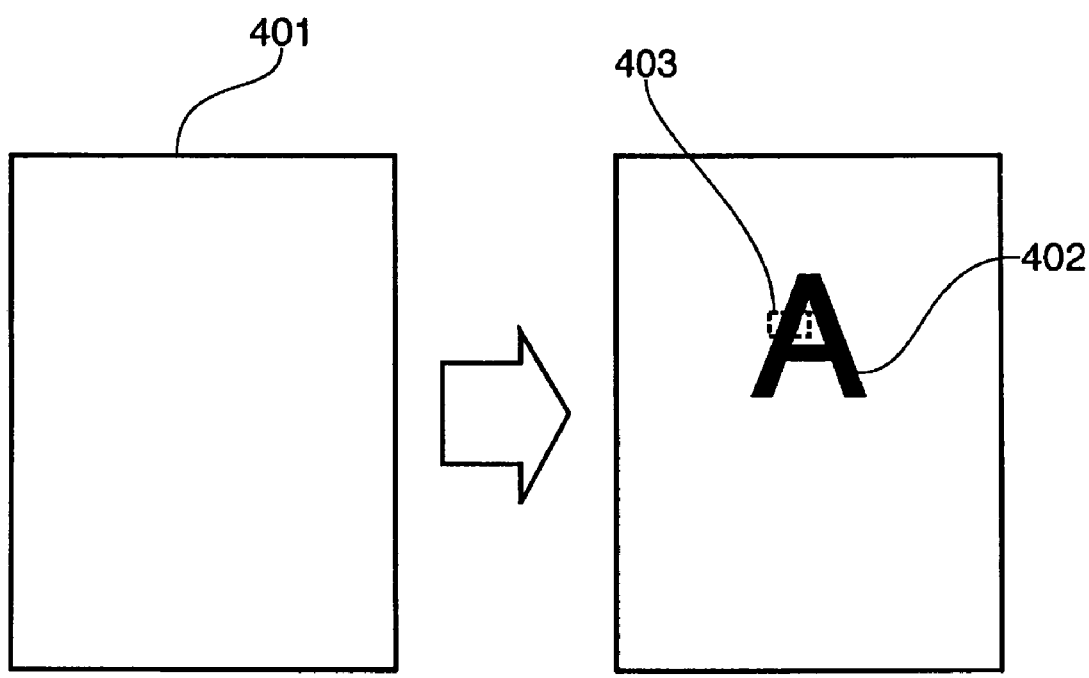

FIG. 5A shows a state in which a character "A" 402 (color is RGB=(0, 0, 0), i.e., black) is drawn on a region 401 where nothing is drawn.

Figure 5B:
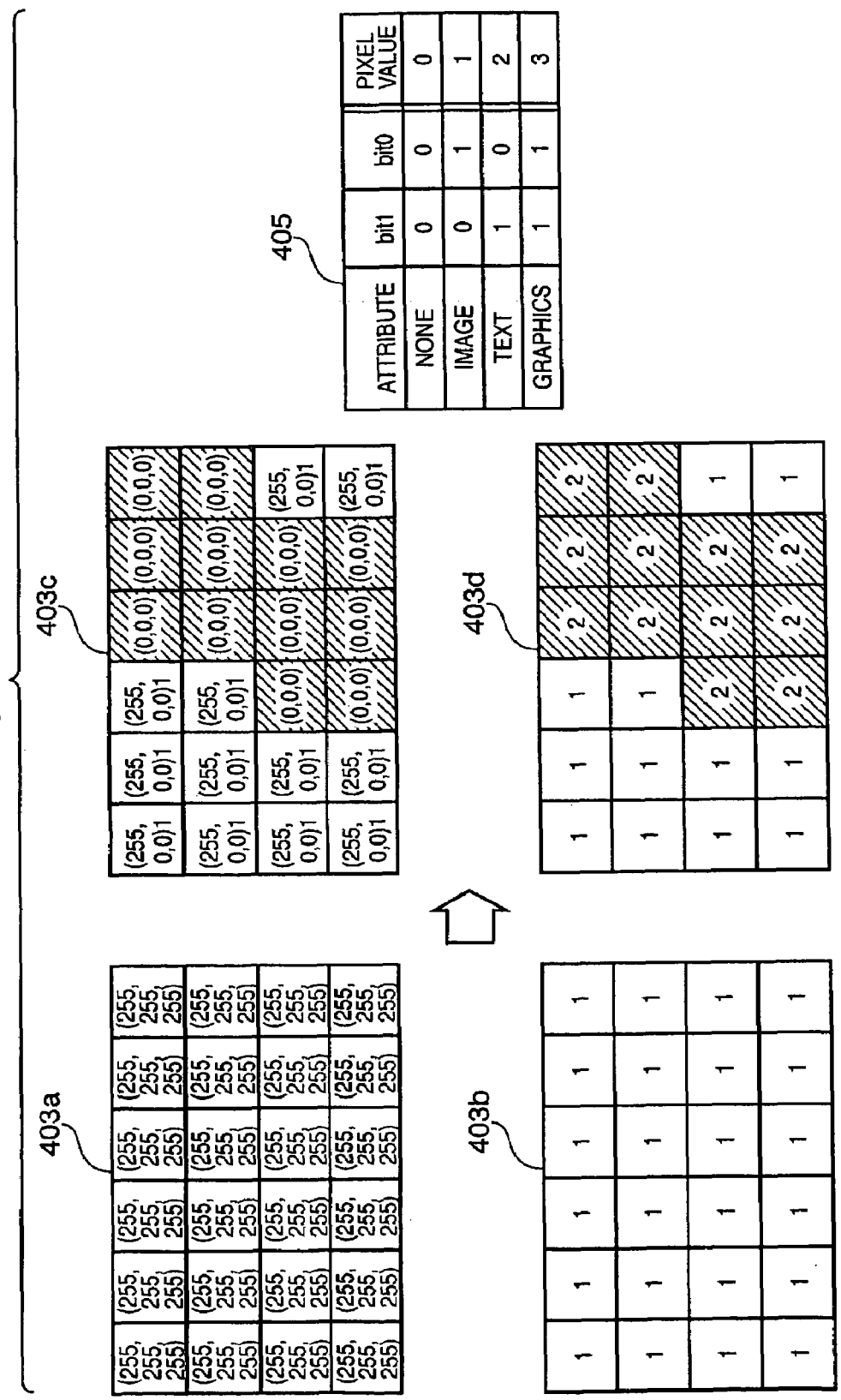

FIG. 5B shows conventional rasterize processing. That is, before drawing of the character 402, a bitmap image 403a corresponding to a part 403 of the region 401 is made up of white pixels of RGB=(255, 255, 255). Also, "1" indicating an image attribute is written as attribute information 403b of the region 403, as shown in a table 405.

When the character 402 is drawn on the region 401, black pixels are drawn on a region corresponding to the character 402 of the region 401, as shown in an enlarged view of a bitmap image 403c, and "2" indicating a text attribute is written, as shown in an enlarged view of attribute information 403d. An initial attribute of a white pixel of RGB=(255, 255, 255) is not particularly limited since the white pixel is generally converted into CMYK=(0, 0, 0, 0) by image output processing.

After the rasterize processing shown in FIG. 5B, data of a total of 26 bits (24 bits for a bitmap image, and 2 bits for attribute information) per pixel must be written out to the RAM 1205.

FIG. 5C shows rasterize processing of the first embodiment. However, the bitmap image 403a and attribute information 403b corresponding to the region 403 before drawing of the character 402 are the same as those in FIG. 5B.

When the character 402 is drawn on the region 401, white pixels on the region 401 are left unchanged, as shown in an enlarged view of a bitmap image 403*e*. On the other hand, "0" indicating a black attribute is written in a region corresponding to the character 402 of the region 401, as shown in an enlarged view of attribute information 403*f*. That is, the rasterize processing of the first embodiment uses a table 406 in which the black attribute is assigned to a pixel value "0" by changing the assignment of the table 405. Then, the black attribute "0" is written in the attribute information of the region corresponding to the character 402, and no black data (RGB=(0, 0, 0)) are drawn on the bitmap image. Note that a pixel of the black attribute can assume any pixel value since it is converted into CMYK=(0, 0, 0, 255) by the image output processing.

When the rasterize processing shown in FIG. 5C is performed, the pixel value (color value) of the bitmap image need not be written out (the color value is not particularly limited) and 2 bits of the attribute information per pixel need only be written out to the RAM 1205 for pixels having the black attribute.

[Image Processing and Image Output Processing]

FIG. 6A is a block diagram showing the image processing and image output processing.

The image processing H/W 1206 receives color values 502 of a bitmap image and attribute values 503 of attribute information, which are stored in the RAM 1205, for respective pixels, and outputs the processing result to the image output H/W 1207.

FIG. 6B is a block diagram showing the color conversion processing and halftone processing executed by the image processing H/W 1206.

A color conversion processor (RGB to CMYK processor) 504 receives the color values 502 and attribute values 503 and selectively switches color conversion LUTs in accordance with the attribute values 503. Color values which have undergone RGB to CMYK color conversion by the LUTs are supplied to a dither processor 505.

The LUTs include an LUT 506 for the image attribute, an LUT 507 for the graphics attribute, an LUT 508 for the text attribute, and an LUT 509 for the black attribute. When an attribute value 503 indicates the black attribute, since the bitmap image is not written out in the rasterize processing, its color value 502 is indefinite. Therefore, the LUT 509 dedicated to the black attribute is prepared to output CMYK=(0, 0, 0, 255) irrespective of an input color value. Note that the color conversion processor 504 may output CMYK=(0, 0, 0, 255) without using any LUT when the attribute value 503 indicates the black attribute.

The dither processor 505 receives the attribute values 503 and CMYK values, and selectively switches dither patterns in accordance with the attribute values 503. CMYK image data that has undergone dithering is sent to the image output H/W 1207.

The dither patterns include a dither pattern 512 for the image attribute, a dither pattern 513 for the graphics attribute, a dither pattern 514 for the text attribute, and a dither pattern 515 for the black attribute. Since a black pixel normally becomes a black pixel after the dithering, a special dither pattern for the black attribute is not required. That is, in case of the black attribute, if the dithering result indicates black upon dithering using another dither pattern, that dither pattern may be used instead. Black after the dithering is expressed by CMYK=(0, 0, 0, 1) if each of C, M, Y, and K components is expressed by 1 bit, CMYK=(0, 0, 0, 3) if each component is expressed by 2 bits, or CMYK=(0, 0, 0, 15) if each component is expressed by 4 bits.

[Display List]

Figure 7A:
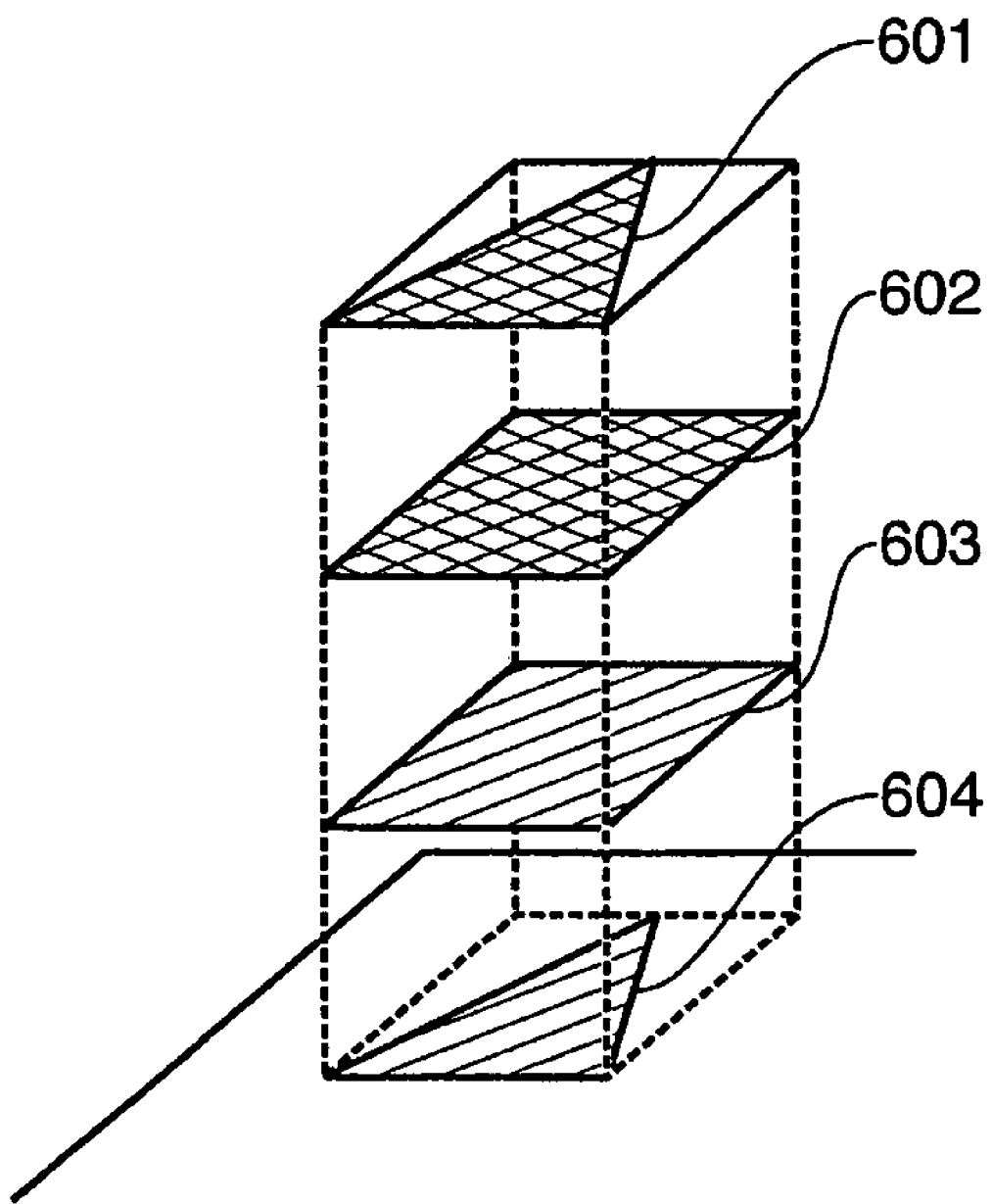
FIG. 7A is a view for explaining a drawing method using the raster operation (ROP) that superposes raster objects.

FIG. 7A is a view for explaining a drawing method using the raster operation (ROP) that superposes raster objects.

It is not a common practice to draw one object in one fill information. As shown in FIG. 7A, a sequence for designating a graphic (e.g., triangle) 601, pattern 602, and a color (e.g., red) 603 and drawing a "triangle filled with a red pattern" 604 is utilized. This corresponds to the AND result of all the graphic 601, pattern 602, and color 603. For example, when a NOTed graphic 601, the pattern 602, and color 603 are logically ANDed, a "white triangle surrounded by a red pattern" can be drawn. Note that the present invention can be applied to alpha-blend arithmetic operations in place of logical operations.

Figure 7B:
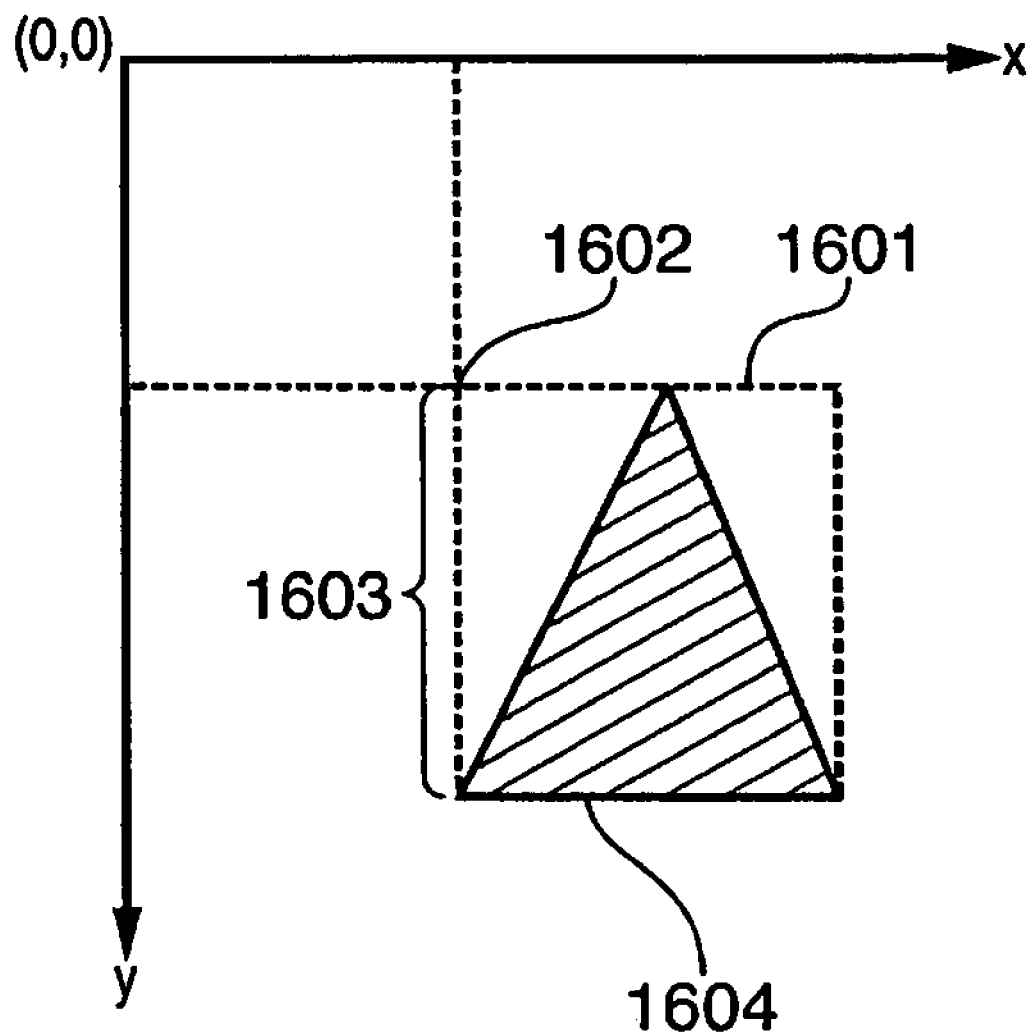
FIG. 7B shows information to be stored in a display list.

FIG. 7B shows a plurality of pieces of information to be stored in a display list, which are roughly classified into a drawing position (coordinates) 1602, drawing sizes 1601 and 1603, and fill information 1604 in a region shown in FIG. 7A. Since the drawing position 1602 and information of the drawing sizes 1601 and 1603 shown in FIG. 7B are numerical value information and one information size is small, these pieces of information are managed as a display list, as shown in the left side in FIG. 7C. On the other hand, since the fill information 1604 tends to be pictorial information, and one information size becomes large, it is difficult to be managed using the display list. Hence, a pointer that points to the fill information to be used is registered in the display list, and the fill information itself is separately managed, as shown in the right side in FIG. 7C.

Figure 7C:
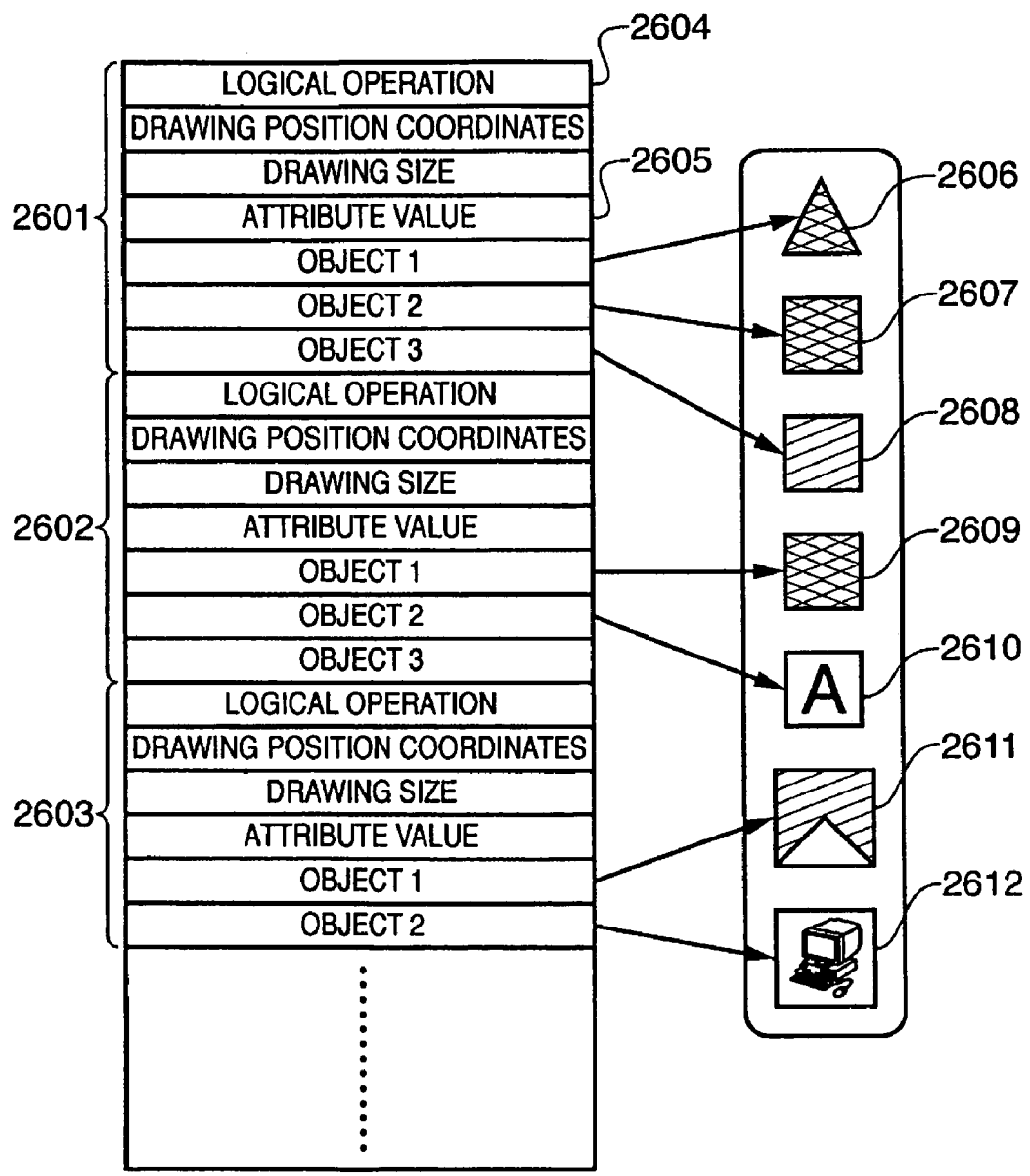
FIG. 7C shows an example of a display list which includes three objects to be drawn.

FIG. 7C shows an example of the display list including three objects to be drawn. To draw objects of a drawing instruction 2601 included in the display list, three pieces of fill information 2606 to 2608 are used. To draw objects of a drawing instruction 2602, two pieces of fill information 2609 and 2610 are used. To draw objects of a drawing instruction 2603, two pieces of fill information 2611 and 2612 are used. Whether or not each object is drawn using black can be determined by checking a combination of the fill information to be used and logical operation information 2604 designated in the drawing instruction.

For example, when the three pieces of fill information 2608, 2607, and 2606 designated to draw the objects of the drawing instruction 2601 respectively indicate red, 1-bit mask information, and a 1-bit pattern, and the logical operation information 2604 indicates an AND operation, the objects are drawn in red. That is, it is determined that the objects of the drawing instruction 2601 are not drawn in black.

On the other hand, when the two pieces of fill information 2609 and 2610 designated to draw the objects of the drawing instruction 2602 respectively indicate black and 1-bit mask information, and the logical operation information indicates an AND operation, the objects are drawn in black. That is, it is determined that the objects of the drawing instruction 2602 are drawn in black.

Furthermore, when the fill information 2611 designated to draw the object of the drawing instruction 2603 includes multi-colors, since the object color is very unlikely to be black, it is determined that the object is not drawn in black without checking the logical operation information.

When the logical operation refers to a background, since the drawing color is unpredictable, it is determined that an object designated with a logical operation that refers to the background is not drawn in black.

As shown in FIG. 7C, the display list comprises a field 2605 which describes attribute values of the objects. The interpretation processing in the first embodiment discriminates a text attribute, graphics attribute, image attribute, and the like upon interpreting PDL data, and informs display list generation processing of that discrimination result, so as to write attribute information in the display list as attribute values 2605. The CPU 1208 rewrites the attribute value of an object to be drawn in only black (to be referred to as "black object" hereinafter) to a black attribute by the discrimination processing of the black object (to be described later).

[Discrimination of Black Object]

Figure 8:
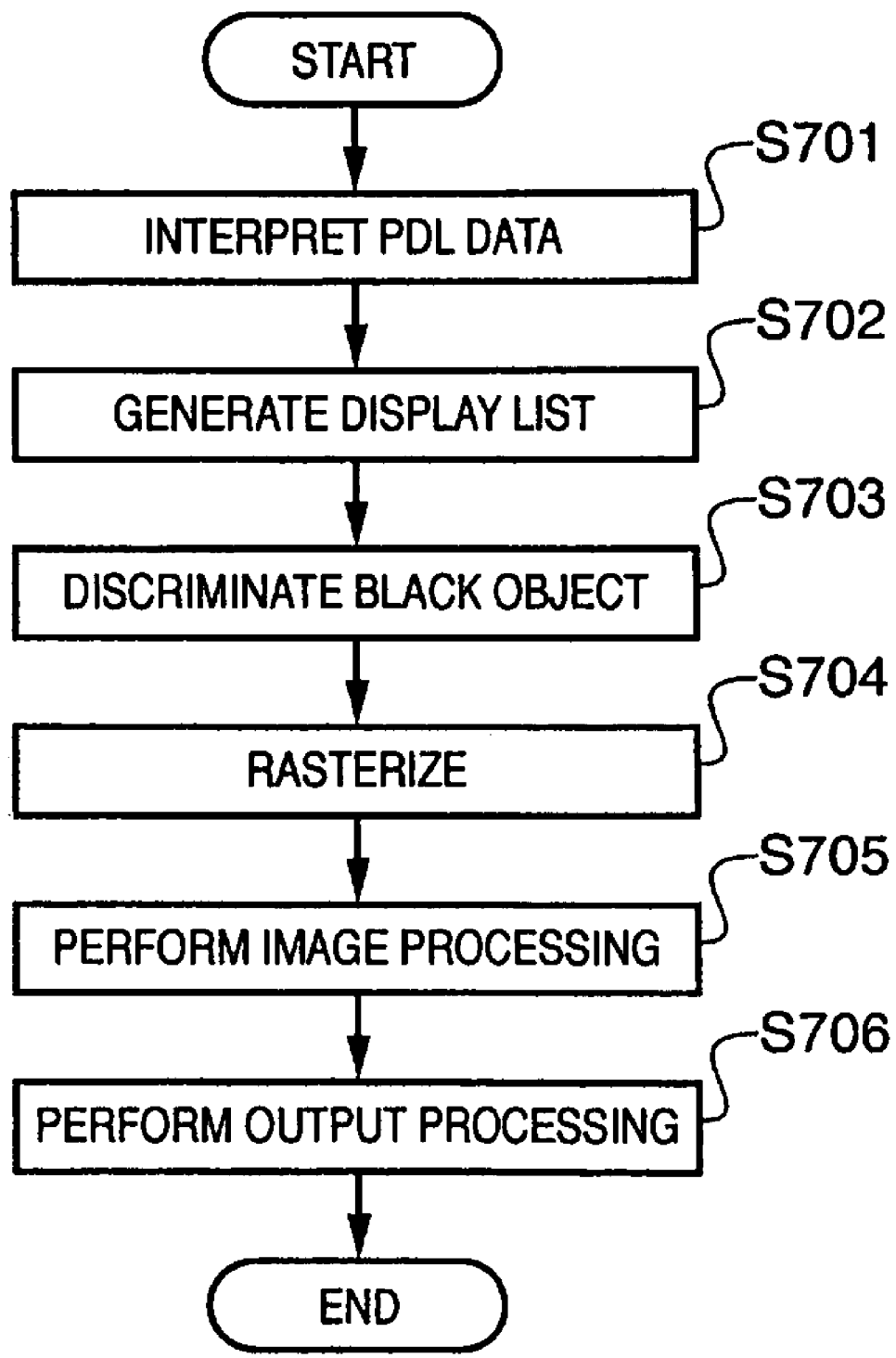
FIG. 8 is a flowchart showing the overall flow of print processing from when PDL data is received until an image is printed on a print sheet.

FIG. 8 is a flowchart showing the overall flow of print processing from when PDL data is received until an image is printed on a print sheet. This processing is executed by the CPU 1208 and the aforementioned hardware components controlled by the CPU 1208.

Upon reception of PDL data from the host computer 200, the CPU 1208 interprets that PDL data by interpretation processing (S701), and generates a display list based on the interpretation result by display list generation processing (S702).

Upon completion of interpretation and generation of the display list of the received PDL data for one page, the CPU 1208 discriminates a black object by checking the display list, and rewrites the attribute value of the black object to a black attribute (S703). After that, the CPU 1208 executes rasterize processing in accordance with the display list, and writes the rasterize result in the RAM 1205 (S704). In this case, for the black object, no bitmap image is drawn, and an attribute value indicating the black attribute is written in the attribute information, as has been described using FIG. 5C.

Upon completion of the rasterize processing by the CPU 1208, the image processing H/W 1206 reads out the bitmap image and attribute information from the RAM 1205. The image processing H/W 1206 executes color conversion and pseudo-halftone processing using LUTs and dither patterns, as has been described using FIG. 6B (S705). The image output H/W 1207 sends CMYK data output from the image processing H/W 1206 to the image output unit 1211, thus printing an image on a print sheet (S706).

Figure 9:
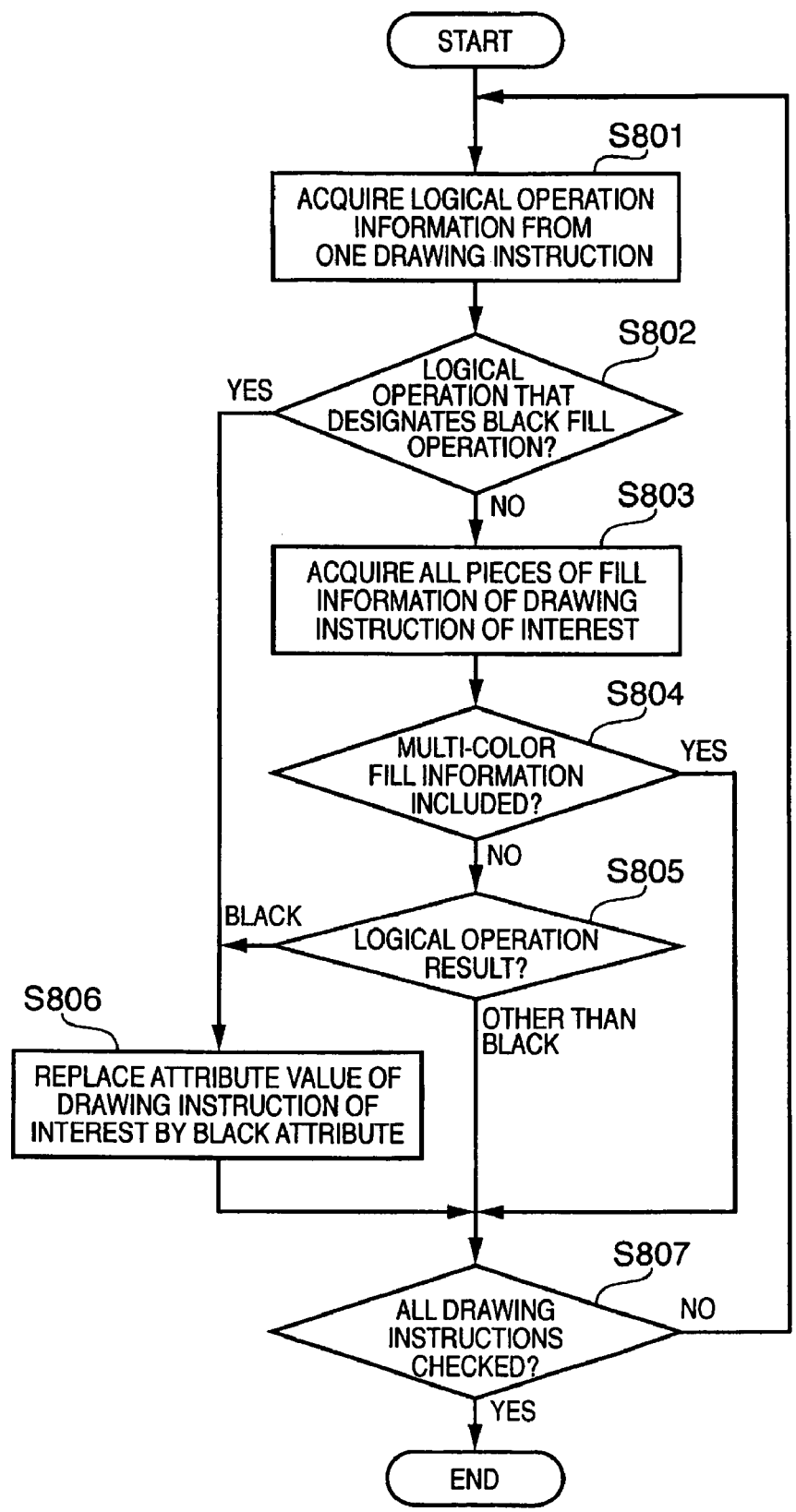
FIG. 9 is a flowchart showing discrimination processing of a black object.

FIG. 9 is a flowchart showing details of the discrimination processing (S703) of a black object.

The CPU 1208 acquires logical operation information from one drawing instruction included in the display list (S801), and checks if that logical operation information designates a black fill operation irrespective of the fill information (S802). In case of such logical operation, the CPU 1208 rewrites the attribute value of the drawing instruction of interest to a black attribute (S806).

If only the logical operation information does not designate a black fill operation, the CPU 1208 acquires all pieces of fill information designated by the drawing instruction of interest (S803), and checks if these pieces of fill information include multi-color fill information (S804). If no multi-color fill information is included, the CPU 1208 predicts if the logical operation result becomes black (S805). If the logical operation result indicates a black fill operation, the CPU 1208 rewrites the attribute value of the drawing instruction of interest to a black attribute (S806).

If at least one multi-color fill information is included, or if the logical operation result does not indicate a black fill operation, the CPU 1208 does not rewrite the attribute value of the drawing instruction of interest.

The CPU 1208 discriminates if all drawing instructions included in the display list are checked (S807), and repeats steps S801 to S807 until all the drawing instructions are checked.

Even when the pixel format of bitmap pixels is not RGB but it is CMYK, grayscale, or the like, the aforementioned processing can be applied.

In this way, after the received PDL data is interpreted and a display list is generated, respective drawing instructions included in the display list are checked to discriminate a black object. If a black object is discriminated, the attribute value of the drawing instruction of interest is rewritten to a black attribute. Upon execution of rasterize processing based on the display list, a bitmap image of the object designated with the black attribute is not generated, and an attribute value indicating the black attribute is written in only its attribute information. Then, in color conversion, pixels with the black attribute are immediately converted into a predetermined value CMYK=(0, 0, 0, 255) irrespective of pixel values (color values) after rasterization. Therefore, the rasterize processing and color conversion processing can be speeded up for the object with the black attribute, thus increasing the image formation speed.

Second Embodiment

Image processing according to the second embodiment of the present invention will be described below. Note that the same reference numerals in the second embodiment denote the same parts as in the first embodiment, and a detailed description thereof will be omitted.

The bitwidth of data to be handled by the CPU is normally a multiple of 8. Hence, upon handling pixel data, if the number of bits per pixel assumes an odd value, the CPU can hardly handle such pixel data. For this reason, the number of bits per pixel of attribute information is handled as even units like 2, 4, 8, . . . Since the read/write amount to the memory is to be reduced, a value as small as possible is to be selected as the number of bits per pixel.

If attribute information is expressed by 2 bits per pixel, four different types of attributes can be designated. Therefore, when original attributes include three different types of attributes, i.e., an image attribute, graphics attribute, and text attribute, one type of attribute is not designated, and a black attribute can be added as in the first embodiment.

However, for example, a thin line attribute is to be added in some cases in addition to the image attribute, graphics attribute, and text attribute. This is because thin line data may become thin or may disappear by dithering in some cases. Hence, image processing for converting a thin line color to a dark color in advance and presenting a thin line from getting thinner or disappearing by dithering is executed. Whether or-not the thin line attribute is required varies depending on data. For example, when a drawing created by CAD is to be printed, the thin line attribute is required. However, most of general document data do not require the thin line attribute. For this reason, the user often designates using a user interface of a printer driver whether or not the thin line attribute is required.

That is, when the thin line attribute is designated, all the four different types of attribute information expressed by 2-bit attribute information are designated, and the black attribute cannot be set since there is no blank attribute.

Figure 10A:
FIGS. 10A and 10B are views for explaining processing according to the second embodiment.
Figure 10B:

In this case, attribute information is expressed by 4 bits per pixel to set the thin line attribute and black attribute, or an attribute of an attribute region which does not exist in a page (no image attribute region exists in FIG. 10B) is replaced by the black attribute, as shown in FIG. 10B.

When the number of bits of attribute information is increased, if a page includes a few objects with the black attribute, an increase in memory read/write amount becomes large as the number of bits of attribute information is increased. Hence, upon generation of a display list, the drawing area of a black object is checked (by counting the number of pixels to be drawn). When the drawing area is equal to or smaller than a predetermined area (the number of pixels), the black attribute is not used. In other words, the number of bits of the attribute information is not increased.

Third Embodiment

Image processing according to the third embodiment of the present invention will be described below. Note that the same reference numerals in the third embodiment denote the same parts as in the first and second embodiments, and a detailed description thereof will be omitted.

Figure 11A:
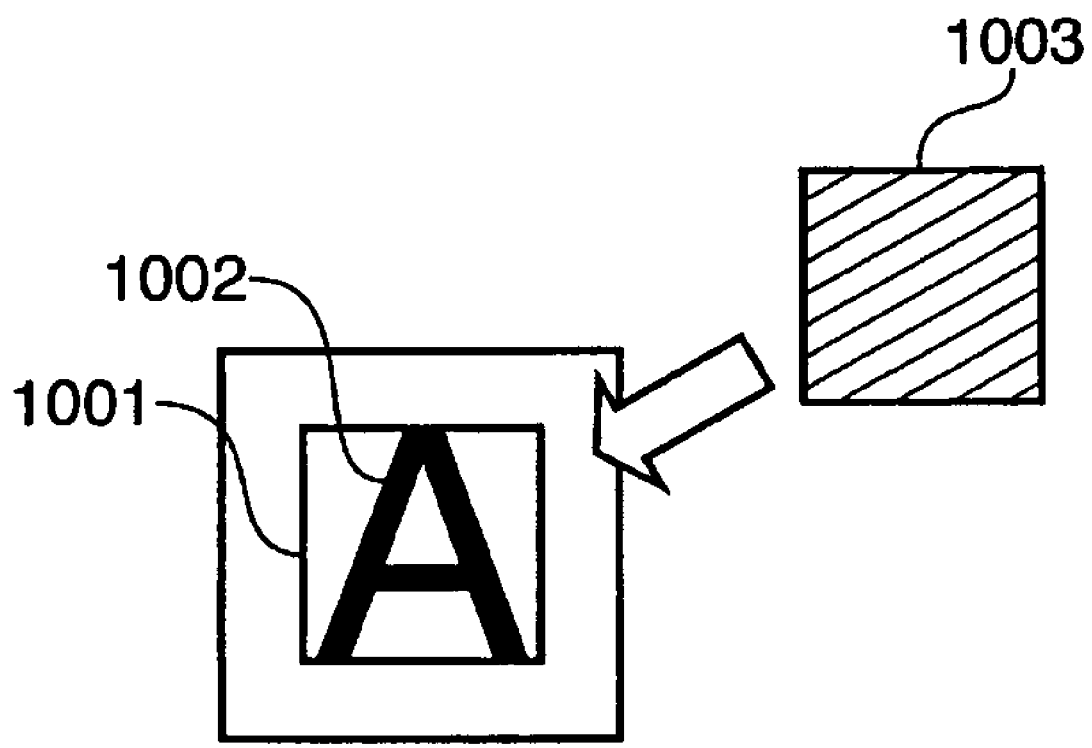
FIG. 11A shows the drawing result obtained by ANDing a red rectangle on a background on which a black character "A" is drawn and which is NOTed.

FIG. 11A shows the drawing result obtained by ANDing a red rectangle 1003 on a background 1001 on which a black character "A" 1002 is drawn and which is NOTed. As the drawing result, a red character "A" is obtained.

Figure 11B:
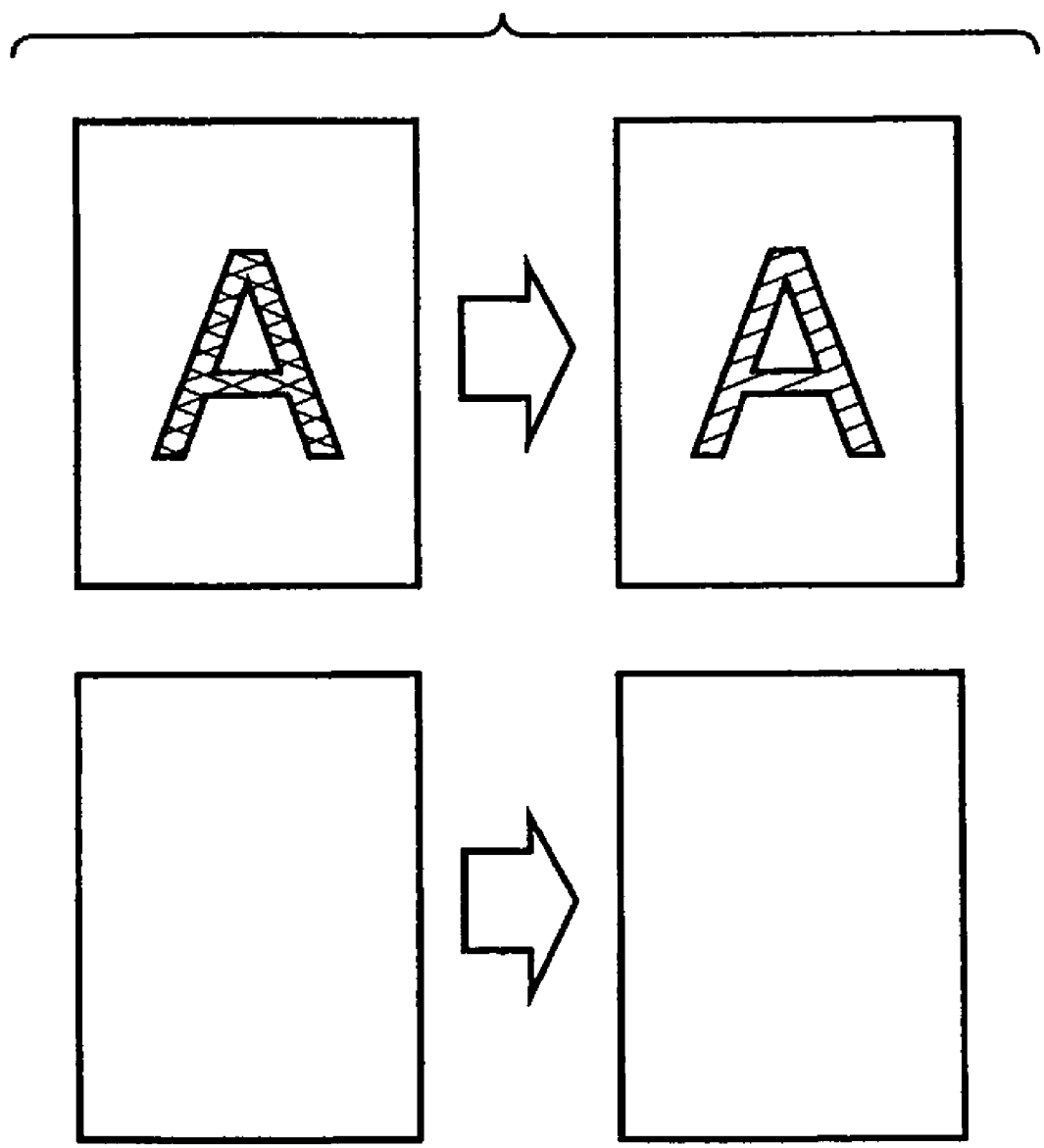
FIG. 11B shows bitmap images on which a black character "A" is drawn in drawing processing in which no black attribute is used and that in which a black attribute is used.

FIG. 11B shows bitmap images on which a black character "A" is drawn in drawing processing in which no black attribute is used and that in which a black attribute is used. In the upper view of FIG. 11B, a character "A" is drawn. In the lower view of FIG. 11B, since the black attribute is applied, no character "A" is drawn.

In this case, when the red rectangle 1003 is simply ANDed on these bitmap images, since the character "A" is rasterized on the bitmap image, as shown in the upper view of FIG. 11B, a red character "A" is drawn. However, when the black attribute is used, since no character "A" is rasterized on the bitmap image, as shown in the lower view of FIG. 11B, nothing is drawn.

Figure 12:
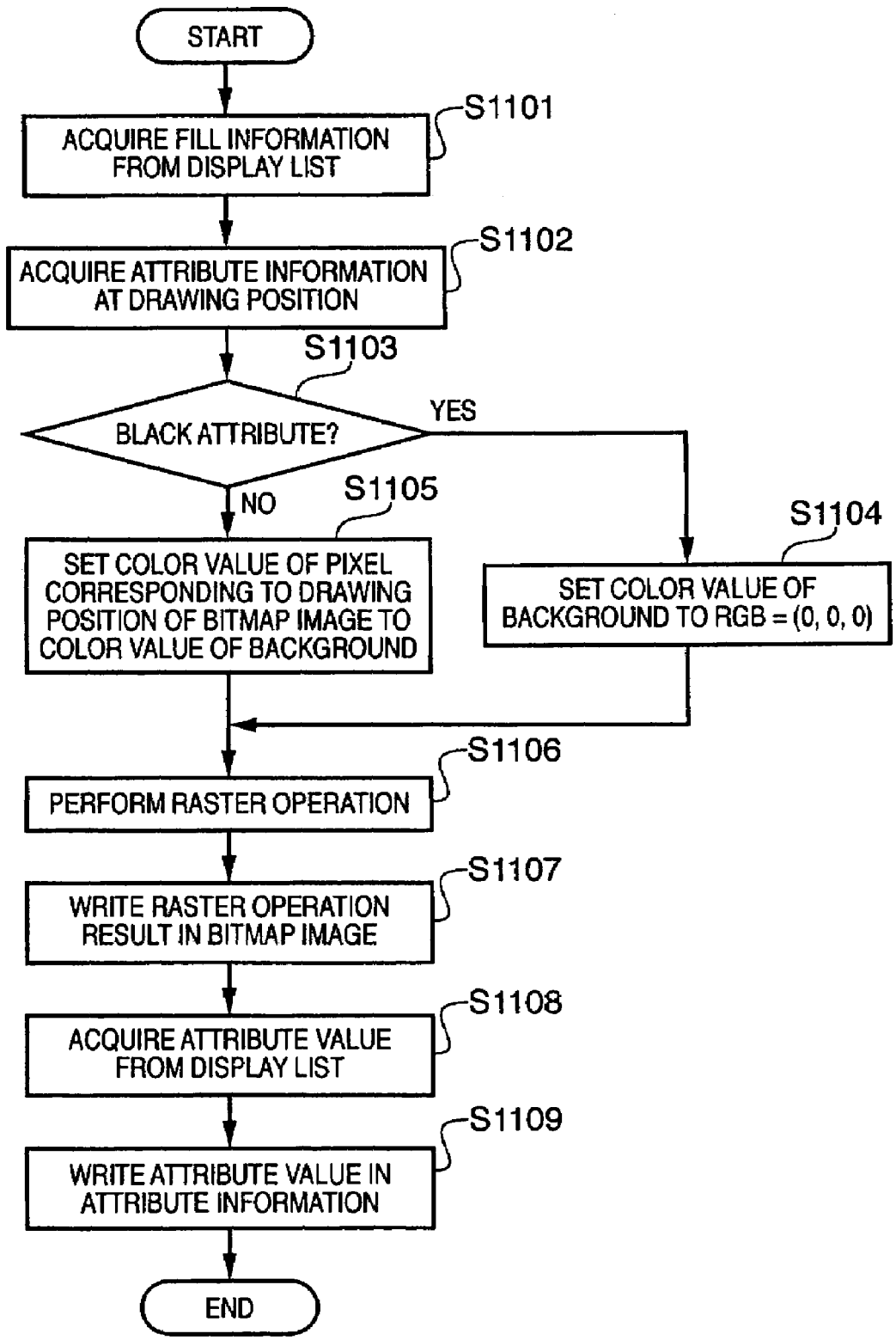
FIG. 12 is a flowchart showing processing for solving a problem posed when a black attribute is applied according to the third embodiment.

FIG. 12 is a flowchart showing processing for preventing the aforementioned problem when the black attribute is applied. This processing is executed by the CPU 1208.

The CPU 1208 acquires fill information from a display list (S1101), acquires attribute information at a drawing position (S1102), and checks if a pixel at the drawing position has a black attribute (S1103). If the pixel at the drawing position has the black attribute, the CPU 1208 sets a color value of the background to RGB=(0, 0, 0) (S1104). On the other hand, if the pixel at the drawing position does not have any black attribute, the CPU 1208 sets a color value of the pixel corresponding to the drawing position of the bitmap image to that of the background (S1105).

Next, the CPU 1208 performs a raster operation (S1106), and writes the drawing result in the bitmap image (S1107). Then, the CPU 1208 acquires an attribute value from the display list (S1108), and writes it in attribute information (S1109).

In this way, in case of a pixel having the black attribute, a normal drawing result can be obtained by setting the color value of its background to RGB=(0, 0, 0).

The drawing processing processes about three hundred thousand pixels when objects are drawn on the entire page of a 600-dpi image. Therefore, when the above judgment is done for each pixel, the drawing processing slows down. Hence, since the number of raster operations which refer to the background is not so large per page, a method that does not apply any black pixel to a region where a raster operation that refers to the background exists is adopted.

FIG. 13A is a view for explaining processing that does not apply any black attribute to a region wherein a raster operation that refers to the background exists.

A band 1302 on which an object 1301 designated with a raster operation that refers to the background is to be drawn is stored. As shown in FIG. 13A, upon expressing the band 1302 by coordinates in internal processing, a method of storing a minimum Y-coordinate value Ymin and maximum Y-coordinate value Ymax is easy. In consideration of the fact that there may be a plurality of objects designated with raster operations that refer to the background, a list of minimum and maximum values of Y-coordinates is saved, as indicated on the right side in FIG. 13A.

Figure 13B:
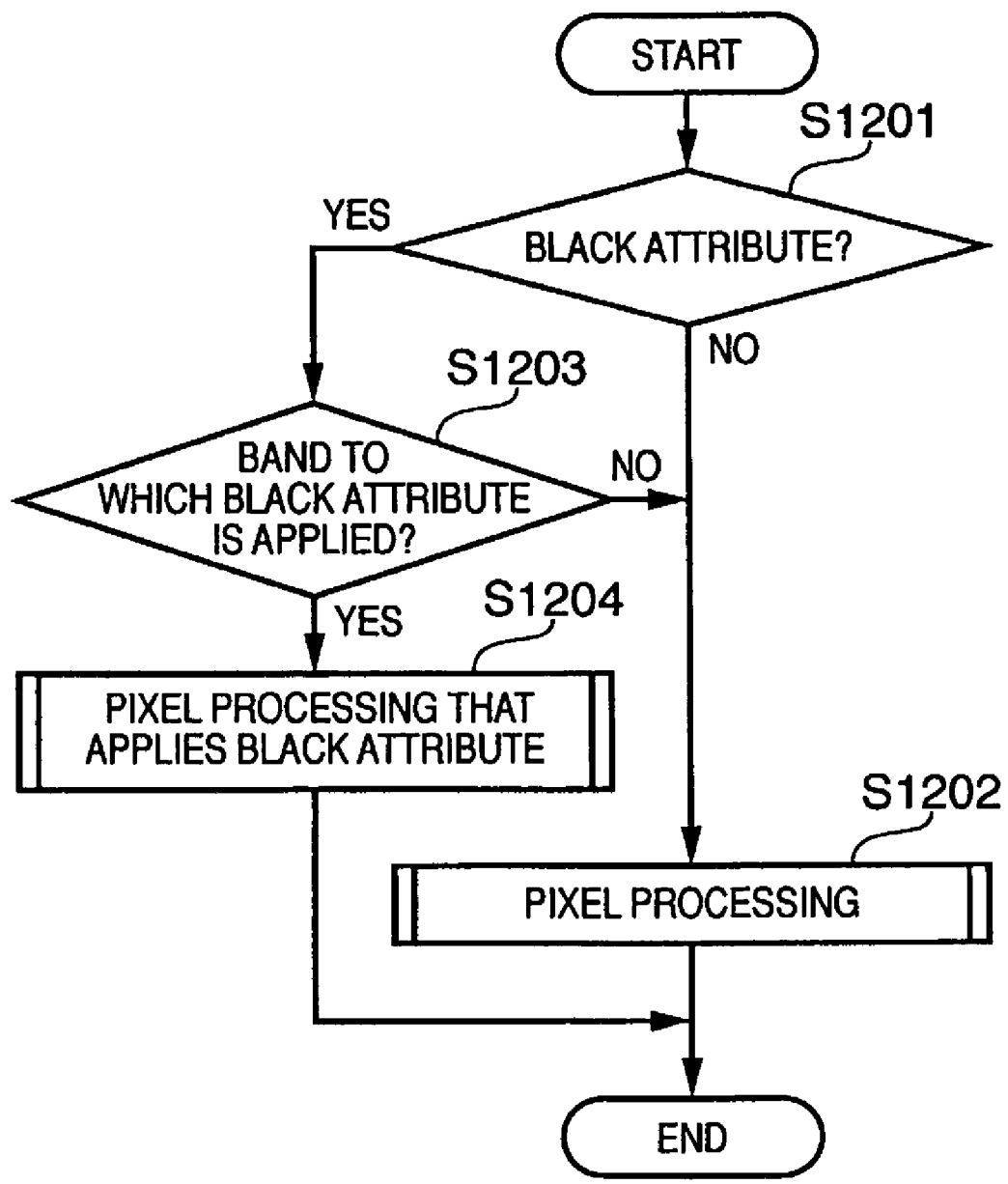
FIG. 13B is a flowchart showing processing for switching whether or not a black attribute is applied.

FIG. 13B is a flowchart showing processing for switching whether or not a black attribute is applied.

The CPU 1208 discriminates an attribute value acquired from the display list (S1201), and applies pixel processing that does not use any black attribute to an object of a non-black attribute (S1202). As for an object of the black attribute, the CPU 1208 discriminates whether or not a band of interest is applied with a black attribute (S1203). If YES in step S1203, the CPU 1208 applies pixel processing that uses a black attribute is applied (S1204); otherwise, the CPU 1208 applies pixel processing that does not use any black attribute (S1202).

Figure 13C:
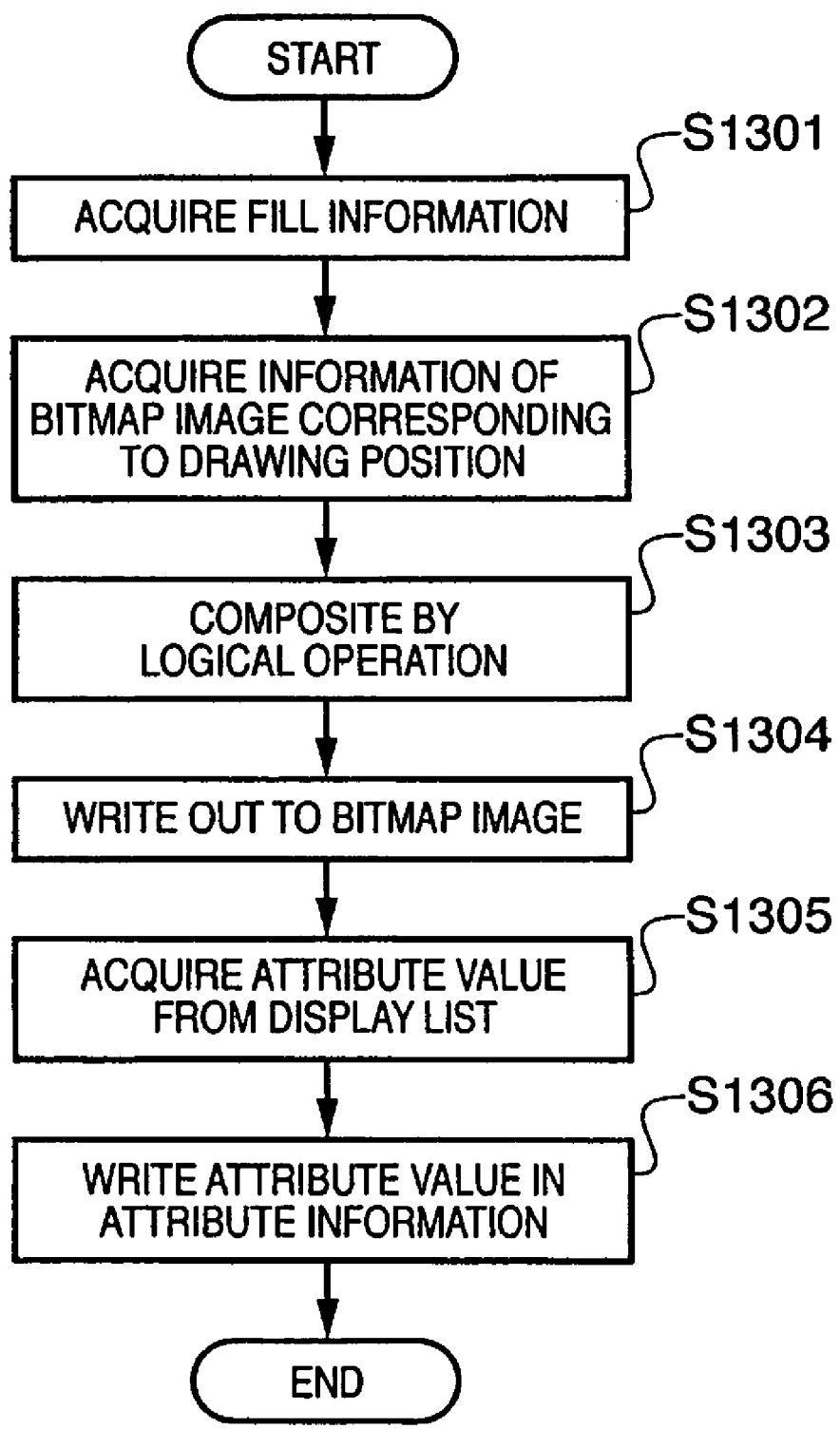
FIG. 13C is a flowchart showing pixel processing that does not apply any black attribute.

FIG. 13C is a flowchart showing the pixel processing (S1202) that does not apply any black attribute.

The CPU 1208 acquires fill information from the display list (S1301), and sets a color value of a pixel on the bitmap image corresponding to a drawing position to that of the background (S1302). The CPU 1208 executes a raster operation (S1303), and writes the raster operation result in the bitmap image (S1304). Then, the CPU 1208 acquires an attribute value from the display list (S1305), and writes it in attribute information (S1306).

In this way, the processing for discriminating if a pixel of interest indicates a black attribute, and setting the color value of a pixel of the background to RGB=(0, 0, 0) in case of the pixel with the black attribute (steps S1103 and S1104 in FIG. 12) is omitted, thus speeding up the processing. Note that the time shorted by one pixel processing shown in FIG. 13C is short. However, since the number of times of processing is very large (a maximum of three hundred thousand times upon drawing objects on the entire page of a 600-dpi image on a A4 print sheet), a long time can be shortened in the entire drawing processing.

Figure 13D:
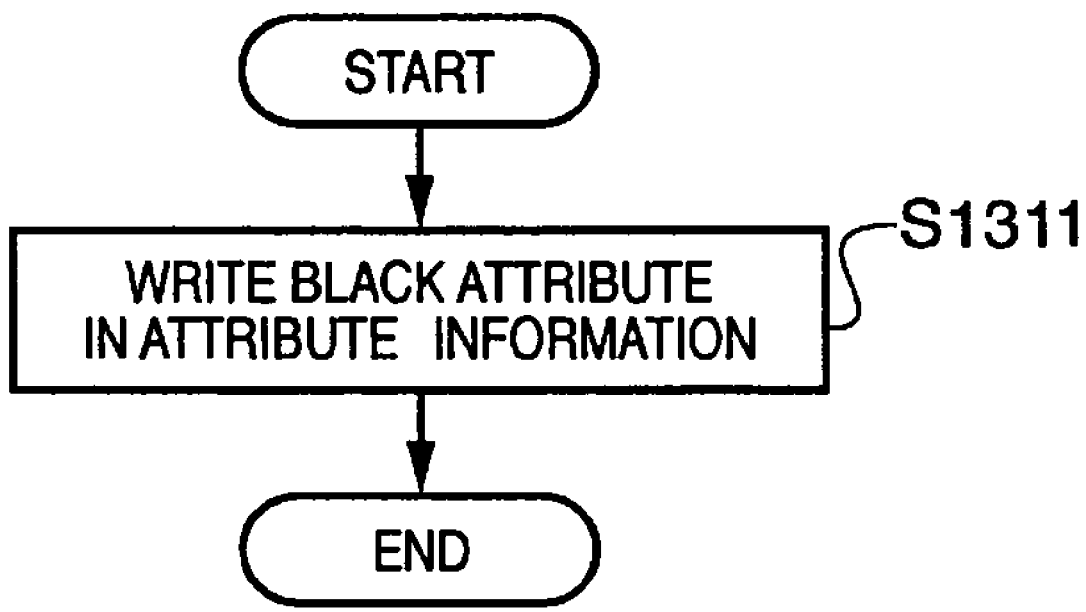
FIG. 13D is a flowchart showing pixel processing that applies a black attribute.

FIG. 13D is a flowchart showing the pixel processing (S1204) that applies a black attribute. The pixel processing that applies the black attribute is attained by only writing an attribute value indicating the black attribute in attribute information (S1311). In this way, when the black attribute is utilized, not only the write-out amount of data is reduced but also processing for each pixel is simplified, thus speeding up the processing.

Fourth Embodiment

Image processing according to the fourth embodiment of the present invention will be described below. Note that the same reference numerals in the fourth embodiment denote the same parts as in the first to third embodiments, and a detailed description thereof will be omitted.

Document data and the like include many black drawing data. On the other hand, presentation data often draws an identical background on all pages. Upon forming such image, it is effective to define the attributes of colors which are frequently used in the background to be drawn on all the pages rather than defining the black attribute. However, the background does not always include one color, but the attributes of a plurality of colors must be defined. However, the number of bits per pixel of attribute information cannot be increased without limitation, as described above. Hence, the attributes of colors that can efficiently speed up processing need be defined.

Figure 14:
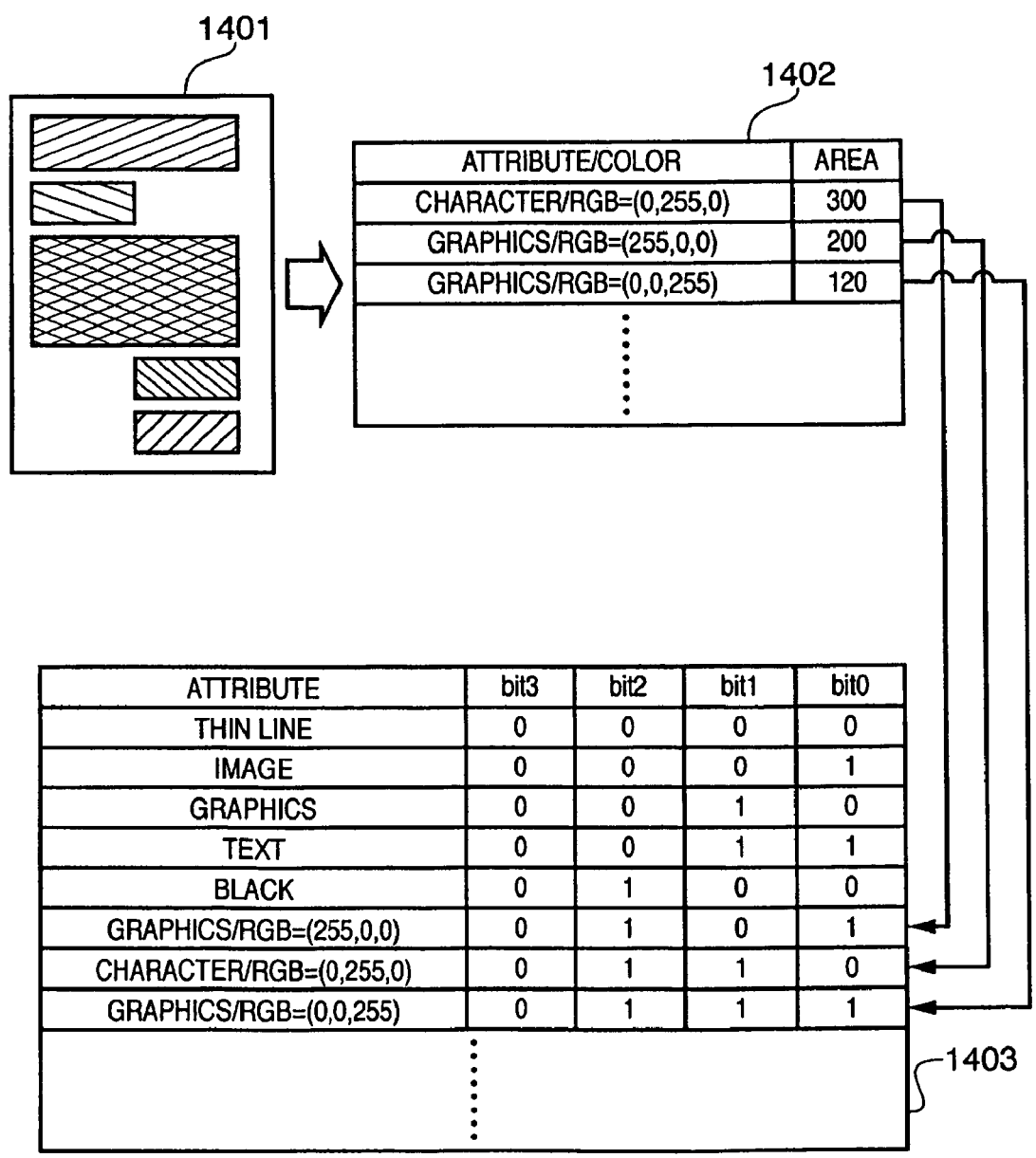
FIG. 14 is a view for explaining a method of defining the attributes of colors so as to efficiently speed up processing according to the fourth embodiment.

FIG. 14 is a view for explaining a method of defining the attributes of colors so as to efficiently speed up processing.

In a drawing example 1401 shown in FIG. 14, a plurality of regions are filled with different colors. The CPU 1208 counts and totals the areas (numbers of pixels) of respective colors to be drawn, and generates a drawing area summary table 1402 which indicates the relationship between the colors and drawing areas. In case of black, the result after image processing remains the same irrespective of the graphics, text, and image attributes, as described above. However, in case of colors other than black, the results after image processing change if they have different attributes (graphics, text, or image attribute). For this reason, colors other than black must be totaled in correspondence with the graphics, text, and image attributes even if they have the same color values.

Upon completion of generation of a display list for one page, the CPU 1208 registers attributes in an attribute assignment table 1403 in turn in descending order of area with reference to the drawing area summary table 1402. An object corresponding to a combination of the attribute and color registered in the attribute assignment table 1403 is not drawn as a bitmap image, and only an attribute value is written in its attribute information as in the aforementioned black attribute.

Also, an increase in data read/write amount due to an increase in number of bits per pixel of attribute information must be balanced with a decrease in read/write amount of the bitmap image due to definition of attributes. For this reason, an attribute which is lower-ranked in the area order is not defined even if the drawing area is broad.

<Fifth Embodiment>

Image processing according to the fifth embodiment of the present invention will be described below. Note that the same reference numerals in the fifth embodiment denote the same parts as in the first to fourth embodiments, and a detailed description thereof will be omitted.

In the description of FIG. 4, when the hardware accelerators operate parallel to the CPU 1208, high-speed image formation can be implemented. In order to implement the parallel op the CPU 1208 and hardware accelerators must process different pages, and a mechanism for spooling a plurality of pages is indispensable in the processing. In order to spool a plurality of pages, a large memory amount is required.

Figure 15:
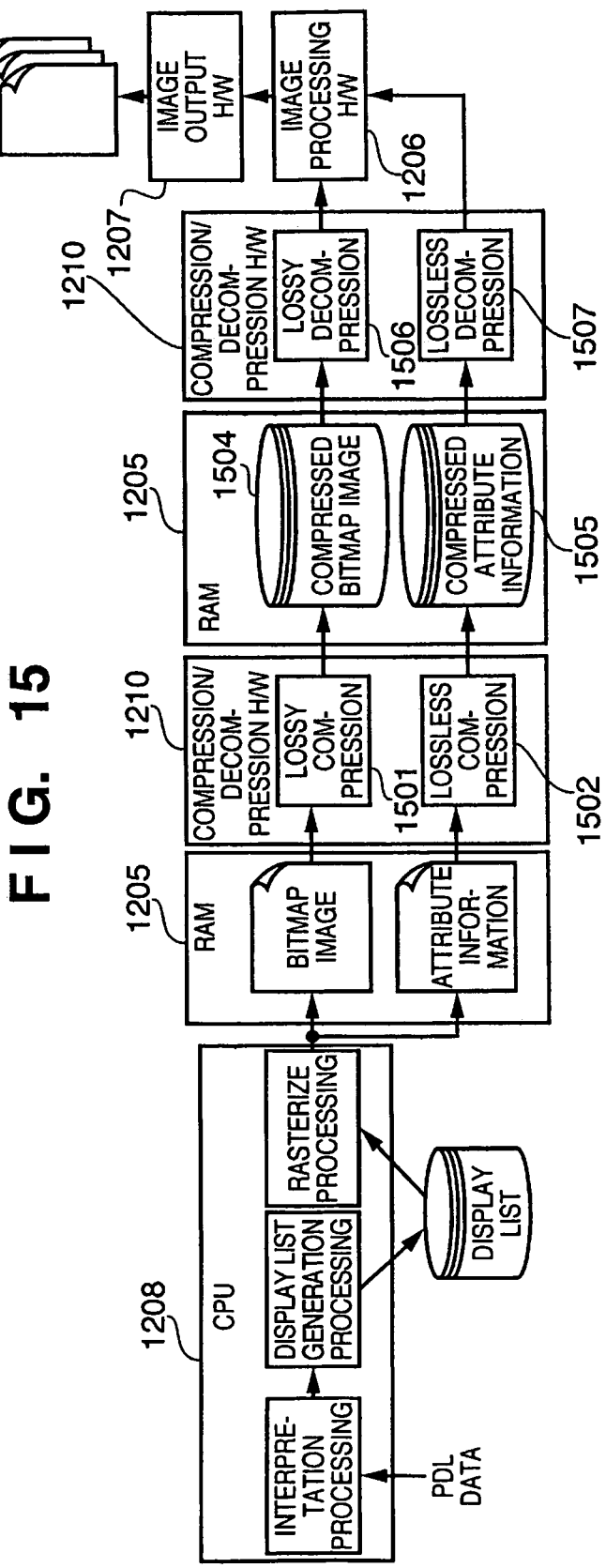
FIG. 15 is a block diagram showing the arrangement of image processing according to the fifth embodiment.

FIG. 15 is a block diagram showing the arrangement of image processing according to the fifth embodiment.

After the rasterize processing by the CPU 1208, the compression/decompression H/W 1210 compresses the bitmap image and attribute information stored in the RAM 1205, and spools them in the RAM 1205. Immediately before processing of the image processing H/W 1206, the compression/decompression H/W 1210 decompresses the spooled bitmap image and attribute information.

The bitmap image amounts to about 96 Mbytes in case of RGB 24 bits, an A4 print sheet, and an image of 600 dpi. On the other hand, the attribute information amounts to about 8 Mbytes in case of 2 bits, an A4 print sheet, and an image of 600 dpi. Therefore, even when the bitmap image undergoes lossless compression, a sufficient compression effect cannot be obtained. Hence, the bitmap image undergoes lossy compression 1501 and lossy decompression 1506, and the attribute information undergoes lossless compression 1502 and lossless decompression 1507.

However, when lossy compression is applied, image deterioration occurs. In JPEG as representative lossy compression, deterioration of a fine pattern and a part with full of variety of colors is relatively small. However, image deterioration called mosquito noise occurs in a portion indicating a sharp edge such as a black line or character drawn on a white background. When the compression ratio is further increased, lattice-shaped image deterioration called block noise occurs. Hence, in the fifth embodiment, lossless compression is applied based on attribute information to a part where image deterioration readily occurs, thus suppressing image deterioration.

FIGS. 16A to 16D are views for explaining an image part that readily suffers image deterioration taking JPEG as an example.

In JPEG, an image part that expresses a sharp edge such as a black line or character drawn on a white background especially readily suffers image deterioration.

Figure 16A:
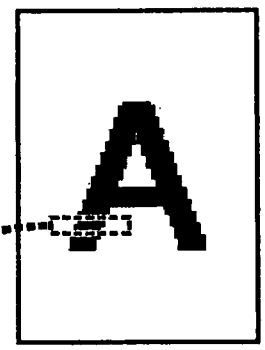
FIGS. 16A to 16D are views for explaining an image part that readily suffers image deterioration taking JPEG as an example.
Figure 16B:
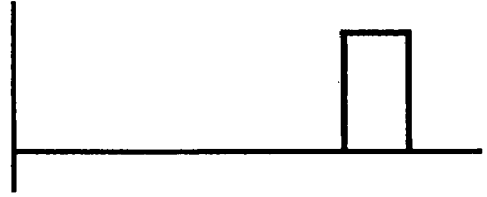
Figure 16C:
Figure 16D:
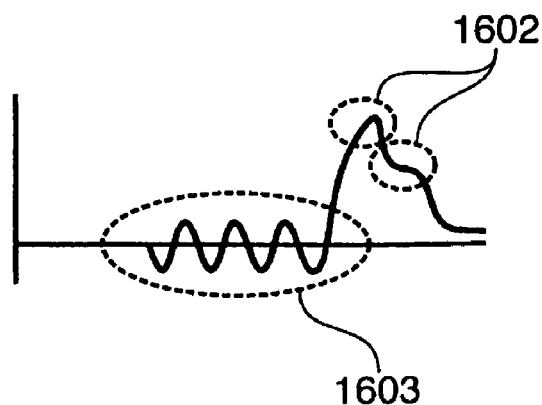

FIG. 16B shows a change in pixel value of an image edge part (a region 1601 shown in FIG. 16A) before lossy compression. No extra pixels are generated near an edge, and the edge is sharp. In order to attain JPEG compression, approximation processing based on discrete cosine transformation (DCT) and quantization is done. FIG. 16C shows a change in pixel value of the image edge part after the approximation processing. At this time, the sharpness of the edge is lost. Furthermore, by removing high-frequency components by quantization, an extra low-frequency part is generated, as shown in FIG. 16D. Parts 1602 induce a change in color, and a part 1603 generates extra pixels. That is, when drawing for filling pixels with a color different from the background to have a predetermined area is done, image deterioration due to lossy compression readily occurs.

An object which especially suffers image deterioration is a text object which is normally drawn in black on a white background. When the aforementioned black attribute is set in an object, the black object does not render a bitmap image, and writes an attribute value in only attribute information. Therefore, the black object does not undergo lossy compression, and does not suffer any image deterioration due to lossy compression.

Figure 17:
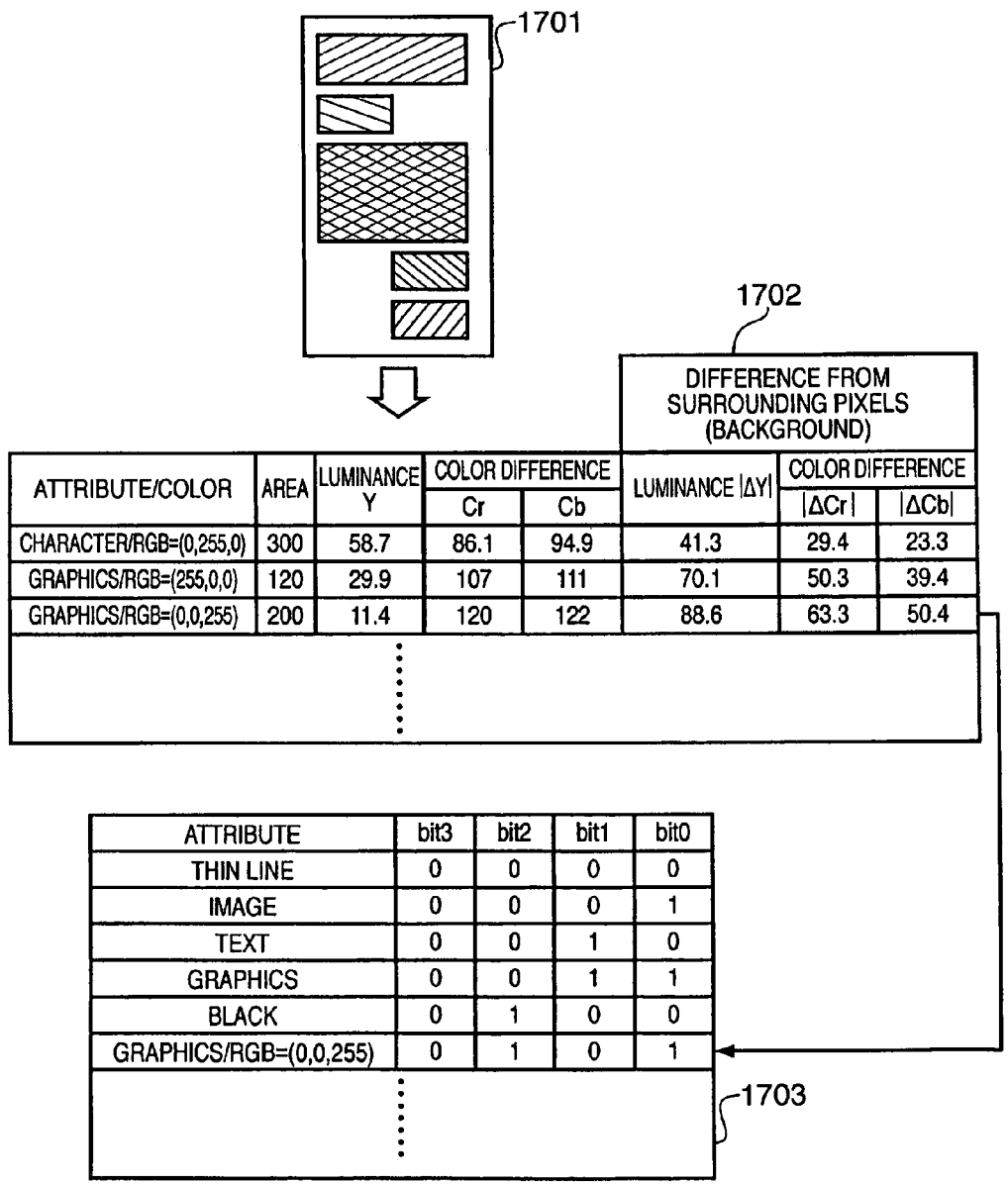
FIG. 17 is a view for explaining a method of extracting an object of a color largely different from a background.

In addition to the black object, when a text object with a color largely different from the background is drawn, image deterioration due to lossy compression readily occurs. FIG. 17 is a view for explaining a method of extracting such object.

The CPU 1208 creates a table 1702 indicating drawing areas, luminance values Y, and color difference values Cr and Cb upon generation of a display list of a drawing example 1701 shown in FIG. 17. The table 1702 further records absolute values $|\Delta Y|$ of differences from the luminance value of the background, and absolute values $|\Delta Cr|$ and $|\Delta Cb|$ of differences from the color difference values of the background. Note that the table 1702 shown in FIG. 17 indicates a case wherein a green text object and red and blue graphics objects are to be drawn when the background is white. Upon completion of generation of the display list, since image deterioration readily occurs at the edge of an object with large differences, a combination of its attribute and color is registered in an attribute assignment table 1703 (FIG. 17 shows an example in which the blue graphics object is registered). For the object whose combination of the attribute and color is defined as an attribute, no bitmap image is drawn, and an attribute value is written in only attribute information as in the black attribute. Therefore, that object does not undergo lossy compression, and does not suffer any image deterioration due to lossy compression as in the black object.

Note that the background color must be checked to obtain the differences from the background. In order to accurately recognize the background color, an overlap of all objects to be drawn is decided to determine the background color. Such processing requires a long processing time. In practice, objects are normally drawn in a state in which nothing is drawn on the background.

In the fifth embodiment, if no background exists, the background color is set to white; if a background exists, the average value of colors used in the background is set as the background color.

FIG. 18 is a flowchart showing processing for determining the background color. This processing is executed by the CPU 1208.

The CPU 1208 accumulates the drawing area and total drawing area for each color (or given similar colors in consideration of gradation) upon generation of a display list (S1801, S1802). The CPU 1208 repeats accumulation until generation of the display list is completed (S1803) or the total drawing area exceeds an area for one page (S1804). Note that the drawing area can be accumulated by, e.g., counting the number of pixels to be drawn.

The CPU 1208 checks if the total drawing area is equal to or larger than a predetermined value with respect to an area (the number of pixels) for one page (S1805). If the total drawing area is smaller than the predetermined value (it is not considered that the background is uniformly drawn on a page), the background is set to white (S1807). If the total drawing area is equal to or larger than the predetermined value, the CPU 1208 checks if there is a color (or similar colors) which has a drawing area equal to or larger than N % (S1806). If there is a color (or similar colors) having a drawing area equal to or larger than N %, that color (or the average value of similar colors) is set as the background color (S1808). If there is no color (or similar colors) having a drawing area equal to or larger than N %, the background color is set to white (S1807).

According to this method, although the background color cannot be accurately recognized, recognition can be made to some extent without lowering the drawing processing speed.

Also, a method of discriminating the background color based on the color of an object to be drawn first is available.

Sixth Embodiment

Image processing according to the sixth embodiment of the present invention will be described below. Note that the same reference numerals in the sixth embodiment denote the same parts as in the first to fifth embodiments, and a detailed description thereof will be omitted.

FIG. 19 is a view for explaining image processing according to the sixth embodiment.

As shown in FIG. 19, the CPU 1208 judges an attribute of each object upon generation of a display list. If an image (page) includes only a black object, the CPU 1208 skips generation and saving of a bitmap image, and executes only generating and saving processing 1901 of attribute information. In this manner, the drawing processing can be speeded up, and the memory size required to save the drawing result can be reduced. Of course, since there is no bitmap image of the page of interest, no compressed bitmap image 1902 need be spooled, thus reducing the memory use amount of the RAM 1205.

Other Embodiments

Furthermore, the invention can be implemented by supplying a software program, which implements the functions of the foregoing embodiments, directly or indirectly, to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Examples of storage medium that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases in which the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-170044 filed on Jun. 9, 2005, which is hereby incorporated by reference herein in its entirety.

What is claimed is:

1. A printer comprising at least a processor and memory, and further comprising:
   a receiver, configured to receive print data described by a page description language from a host computer;

a generator, configured to generate rendering commands of objects by analyzing the received print data;

a determiner, configured to determine whether a rendering command instructs a rendering of a black object or not;

a rendering section, configured to render bitmap images of the objects and generate attribute information for respective pixels in accordance with the rendering commands, wherein the attribute information indicates an image type of a pixel, with a bit width of the attribute information less than that of each bitmap image; and an image processor, configured to generate bitmap images for printing having a CMYK format based on the attribute information, wherein said rendering section stores in the memory the rendered bitmap images having a RGB format and the attribute information indicating no black image to be rendered as instructed by the rendering commands, and stores in the memory no bitmap image but only the attribute information indicating a black image to be rendered as instructed by the rendering commands, and wherein said image processor generates the bitmap images for printing from the bitmap images stored in the memory if the corresponding attribute information indicates no black image, and generates the bitmap images for printing representing the black image from the attribute information stored in the memory if the attribute information indicates the black image.

2. The apparatus according to claim 1, further comprising an output section configured to perform dither processing on the bitmap images for printing generated by said image processor and output the bitmap images on which the dither processing is performed to a printer engine.

3. An image processing method of a printer, comprising the steps of:

receiving print data described by a page description language from a host computer;

generating rendering commands of objects by analyzing the received print data;

determining whether each rendering command instructs a rendering of a black object or not;

rendering bitmap images of the objects and generating attribute information for respective pixels in accordance with the rendering commands, wherein the attribute information indicates an image type of each pixel, with a bit width of the attribute information less than that of each bitmap image; and generating bitmap images for printing having a CMYK format based on the attribute information, wherein in the rendering and generating step, the rendered bitmap images having a RGB format and the attribute information indicating no black image to be rendered as instructed by the rendering commands are stored in a memory, and no bitmap image but only the attribute information indicating a black image to be rendered as instructed by the rendering commands is stored in the memory, wherein in the generating step, the bitmap images for printing are generated from the bitmap images stored in the memory if the corresponding attribute information indicates no black image, and the bitmap images for printing representing the black object are generated from the attribute information stored in the memory if the attribute information indicates the black object, and wherein at least some of said steps are performed using a computer.

4. A computer-readable storage medium storing a computer-executable program for causing a computer to perform an image processing method, the method comprising the steps of:

receiving print data described by a page description language from a host computer;

generating rendering commands of objects by analyzing the received print data;

determining whether each rendering command instructs a rendering of a black object or not;

rendering bitmap images of the objects and generating attribute information for respective pixels in accordance with the rendering commands, wherein the attribute information indicates an image type of each pixel, with a bit width of the attribute information less than that of each bitmap image; and generating bitmap images for printing having a CMYK format based on the attribute information, wherein in the rendering and generating step, the rendered bitmap images having a RGB format and the attribute information indicating no black image to be rendered as instructed by the rendering commands, are stored in a memory, and no bitmap image but only the attribute information indicating a black image to be rendered as instructed by the rendering commands is stored in the memory, and wherein in the generating step, the bitmap images for printing are generated from the bitmap images stored in the memory if the corresponding attribute information indicates no black image, and the bitmap images for printing representing the black color object are generated from the attribute information stored in the memory if the attribute information indicates the black object.

* * * * *